(12) United States Patent
Ricker et al.

(10) Patent No.: US 10,400,583 B1
(45) Date of Patent: Sep. 3, 2019

(54) METHODS AND SYSTEMS FOR SPATIAL CHANGE INDICATOR ANALYSIS

(71) Applicant: Petra Analytics, LLC, Marietta, GA (US)

(72) Inventors: Joseph Allen Ricker, Olive Branch, MS (US); David C. Winchell, Collierville, TN (US); Timothy O. Goist, Marietta, GA (US)

(73) Assignee: Petra Analytics, LLC, Marietta, GA (US)

( * ) Notice: Subject to any disclaimer, the term of this patent is extended or adjusted under 35 U.S.C. 154(b) by 242 days.

(21) Appl. No.: 15/388,753

(22) Filed: Dec. 22, 2016

(51) Int. Cl.
*E21B 47/10* (2012.01)
*G01V 99/00* (2009.01)

(52) U.S. Cl.
CPC ............ *E21B 47/10* (2013.01); *G01V 99/005* (2013.01)

(58) Field of Classification Search
CPC .............................. E21B 47/10; G01V 99/005
See application file for complete search history.

(56) References Cited

U.S. PATENT DOCUMENTS

| | | | |
|---|---|---|---|
| 9,299,038 B2 | 3/2016 | Ricker et al. | |
| 2004/0225635 A1* | 11/2004 | Toyama | G06F 16/444 |
| 2008/0297360 A1* | 12/2008 | Knox | G01N 21/49 |
| | | | 340/628 |
| 2010/0280755 A1* | 11/2010 | Pillsbury | G06Q 30/02 |
| | | | 702/2 |
| 2012/0318925 A1* | 12/2012 | Gibson | B64G 1/52 |
| | | | 244/158.3 |
| 2013/0035867 A1* | 2/2013 | De Moor | G06K 9/38 |
| | | | 702/19 |
| 2013/0113939 A1* | 5/2013 | Strandemar | G06T 5/10 |
| | | | 348/164 |
| 2013/0138349 A1* | 5/2013 | Kram | B09C 1/002 |
| | | | 702/12 |
| 2013/0179078 A1* | 7/2013 | Griffon | G06Q 50/26 |
| | | | 702/3 |

(Continued)

OTHER PUBLICATIONS

Guillaume Tochon et al, "Object Tracking by Hierarchical Decomposition of Hyperspectral Video Sequences: Application to Chemical Gas Plume Tracking", Aug. 2017 IEEE Transactions on Geoscience and Remote Sensing, Vol. 55, No. 8, p. 4567-4585 (Year: 2017).*

(Continued)

*Primary Examiner* — Stephanie E Bloss
(74) *Attorney, Agent, or Firm* — Meunier Carlin & Curfman LLC

(57) ABSTRACT

Disclosed herein are exemplified methods and systems for evaluating a contaminant plume so as to generate presentations of temporal and spatial changes in the contaminant plume that facilitates readily identifiable interpretations of subtle, though significant, changes in concentrations or mass of the plume overtime. Exemplified presentations of the changes in the contaminant plume can facilitate more accurate assessment of plume behavior as well as the beneficial identification (in a more readily and systematic manner) of actionable events at the plume, including identification of new contaminant sourcing, identification of effective or ineffective applied remediation (e.g., monitor progress of Monitored Natural Attenuation (MNA)), and identification of changing site location, among others.

24 Claims, 14 Drawing Sheets

(56) References Cited

U.S. PATENT DOCUMENTS

| | | | | |
|---|---|---|---|---|
| 2014/0016829 A1* | 1/2014 | Chen | ........................ | G06T 7/20 |
| | | | | 382/107 |
| 2014/0032160 A1* | 1/2014 | Rella | ...................... | G01M 3/20 |
| | | | | 702/127 |
| 2015/0019185 A1* | 1/2015 | Cunningham | ...... | G06F 17/5009 |
| | | | | 703/6 |
| 2016/0216172 A1* | 7/2016 | Rella | .................. | G01N 33/0009 |
| 2016/0298447 A1* | 10/2016 | Mohaghegh | ........ | E21B 41/0064 |
| 2017/0091350 A1* | 3/2017 | Bauer | ................ | G06F 17/5095 |
| 2017/0336281 A1* | 11/2017 | Waxman | ................ | G01M 3/38 |
| 2017/0363541 A1* | 12/2017 | Sandsten | ............ | G01N 21/3504 |
| 2018/0036448 A1* | 2/2018 | Becker | ................... | A61L 9/032 |

OTHER PUBLICATIONS

Ricker, "A Practical Method to Evaluate Ground Water Contaminant Plume Stability", Ground Water Monitoring & Remediation 28, No. 4, 2008, pp. 85-94.

* cited by examiner

METHODS AND SYSTEMS FOR SPATIAL CHANGE INDICATOR ANALYSIS

TECHNICAL FIELD

The present disclosure relates methods and systems for presenting spatial change indicator for analysis.

BACKGROUND

There are tens of thousands of sites across the U.S. and the world where monitoring wells are installed to monitor contaminant plumes. Once installed, these monitoring wells are typically subjected to years or decades of sampling to assess the stability of a plume. Vast amount of data can be collected over the course of such monitoring.

One type of evaluation, to assess the effects of site events on a plume, entails using environmental professionals to visually compare differences between two or more iso-concentration maps or to visually compare groundwater concentrations over time on a well-by-well basis.

What are needed are methods and systems that overcome the challenges in the art, some of which are described above.

SUMMARY

Disclosed herein are exemplified methods and systems that facilitates evaluation of a contaminant plume by generating presentations of temporal and spatial changes in the plume that facilitates readily identifiable interpretations of subtle, though significant, changes in concentrations or mass of the plume overtime. In some embodiments, the presentation provides an optimized, or near optimized, normalized scaling of determined spatial change data while also highlighting areas of interests, e.g., to highlight portions of the data where remediation goals are met and/or portions of the data where plume migration has occurred or where new plumes have formed. Exemplified presentations of the changes in the contaminant plume can facilitate more accurate and systematic assessments of the plume behavior as well as the beneficial identification (in a more readily and systematic manner) of actionable events to improve remediation efforts thereat, including identification of new contaminant sourcing, identification of effective or ineffective applied remediation (e.g., monitor progress of Monitored Natural Attenuation (MNA)), and identification of plume migration, among others.

In an aspect, a method is disclosed of generating presentation of spatial changes of a plume. The method includes generating, by a processor, a spatial-change grid data from a plurality of data sets (e.g., spatial data of plume concentration over an area or spatial data of plume mass over the area) associated with a plume, wherein the plurality of datasets includes a first data set and a second data set, wherein the first data set is associated with measurements collected at a first date and the second data set is associated with measurements collected at a second date, and causing, by the processor, graphical presentation of spatial changes of a plume based on the generated spatial-change grid data (e.g., in a report or in a graphical user interface of a software application executing on a computing device, e.g., wherein the report of interface is used to direct subsequent remedial action of the plume). The operation of generating the spatial change grid data includes a) determining, by the processor, a difference between i) a first spatial grid data (e.g., wherein the first spatial grid data is retrieved from the first data set or a processed set of data values derived from the first data set) associated with the first data set and ii) a second spatial grid data associated with the second data set (e.g., on a node-by-node basis) (e.g., by a subtractive operation of the second "subsequent" spatial grid data by the first "prior" spatial grid data); and b) normalizing based on a relative-change value, the determined difference between the first spatial grid and the second spatial grid (e.g., to optimize the range of the data from presentation) to generate the spatial-change grid data (e.g., wherein the relative-change value is a determined maximum relative-change value determined from all data associated with the site; or a determined maximum relative-change value determined from some data associated with the site; or a relative-change value determined from a maximum relative change value for the site) in which, for each portion of the second spatial grid data determined to have no plume (e.g., wherein the corresponding nodes values is below the baseline concentration) and a corresponding portion of the first spatial grid data determined to have a plume (e.g., wherein the corresponding nodes values is above the baseline concentration), the corresponding portion of the generated spatial change grid data is updated to a first value distinguishable (e.g., to highlight presence of regions of the region where remediation goals have been met) to a presentation scale associated with the normalized relative-change value (e.g., as a highlighting function, e.g., to a value, −k, outside the presentation scale of the normalized data).

In some embodiments, the method further includes, for each portion of the second spatial grid data determined to have a plume and a corresponding portion of the first spatial grid data determined to not have a plume, updating the corresponding portion of the generated spatial change grid data to a second value distinguishable (e.g., to highlight presence of a new plume or plume migration over the course of the analyzed data sets) to the presentation scale associated with the normalized relative-change value (e.g., as a highlighting function, e.g., to a value, +k, outside the presentation scale of the normalized data).

In some embodiments, the method further includes generating, by the processor, a second spatial-change grid data (e.g., to present changes from a baseline data set) from the plurality of data sets associated with the plume, wherein the plurality of datasets includes the first data set and a third data set, wherein the first data set is associated with measurements collected at a first baseline date and the third data set is associated with measurements collected at a third date, the first date being prior to the third date, and causing, by the processor, second graphical presentation of spatial changes of the plume based on the generated second spatial-change grid data (e.g., wherein the second graphical presentation is used to direct subsequent remedial action of the plume). The operation of generating the second spatial change grid data includes the operation of determining, by the processor, a second difference between i) the first spatial grid data associated with the first data set and ii) a third spatial grid data associated with the third data set; and normalizing, by the processor, based on a relative-change value, the determined difference between the first spatial grid and the third spatial grid to generate the second spatial-change grid data. In some embodiments, for each portion of the third spatial grid data determined to have no plume and a corresponding portion of the first spatial grid data determined to have a plume, the corresponding portion of the generated second spatial change grid data is updated to the first value distinguishable to the presentation scale associated with the normalized relative-change value, and, for each portion of the third spatial grid data determined to have a plume and a corresponding portion of the first spatial grid data determined to not have a plume, the corresponding portion of the generated spatial change grid data is updated to a second value distinguishable to the presentation scale associated with the normalized relative-change value.

In some embodiments, the method further includes generating, by the processor, a third spatial-change grid data (e.g., to present second changes from the baseline data set) from the plurality of data sets associated with the plume, wherein the plurality of datasets includes the first data set and a fourth data set, wherein the first data set is associated with measurements collected at the first baseline date and the fourth data set is associated with measurements collected at a fourth date, the first date being prior to the fourth date, and causing, by the processor, third graphical presentation of spatial changes of the plume based on the generated third spatial-change grid data (e.g., wherein the third graphical presentation is used to direct subsequent remedial action of the plume). The operation of generating the third spatial change grid data includes determining, by the processor, a third difference between i) the first spatial grid data associated with the first data set and ii) a fourth spatial grid data associated with the fourth data set; and normalizing, by the processor, based on a relative-change value, the determined difference between the first spatial grid and the fourth spatial grid to generate the fourth spatial-change grid data.

In some embodiments, the first spatial-change grid data for the first data set and second data set is generated at a determined first inflection point in a determined trend of the plume. The determined trend, in some embodiments, is selected from the group consisting of a mass indicator trend, an areal trend, and a concentration trend.

In some embodiments, a spatial-change grid data (e.g., in a cumulative spatial change analysis) is generated over a plurality of data sets associated with a determined constant trend of the plume. In some embodiments, the determined trend is selected from the group consisting of a mass indicator trend, an areal trend, and a concentration trend.

In some embodiments, the portion of the second spatial grid data determined to have no plume and the corresponding portion of the first spatial grid data determined to have the plume is determined based on:

if (node($x,y$) of Grid $B<BL$) AND if (node($x,y$) of Grid $A \geq BL$)

wherein node(x,y) denotes a node value at x, y position of the grid data, Grid B refers to the second spatial grid data, Grid A refers to the first spatial grid data, and BL refers to a baseline concentration.

In some embodiments, the portion of the second spatial grid data determined to have a plume and the corresponding portion of the first spatial grid data determined to not have a plume is determined based on:

if (node($x,y$) of grid $B \geq BL$)&& if (node ($x,y$) of grid $A<BL$)

wherein node(x,y) denotes a node value at position x and position y of the grid data, Grid B refers to the second spatial grid data, Grid A refers to the first spatial grid data, and BL refers to a baseline concentration.

In some embodiments, the operation of normalizing, based on a relative-change value, the determined difference between the first spatial grid and the third spatial grid to generate the second spatial-change grid data, is based on:

$$\text{Grid}\Delta(x, y)' = \frac{\text{Grid}\Delta(x, y)}{|\max(\text{Grid}\Delta(x, y))_{n=1\ldots n\_max}|} \text{ for } x = 1 \ldots x_{max},$$

$$y = 1 \ldots y_{max}$$

wherein Grid$\Delta$(x,y) denotes the determined difference between the first spatial grid and the third spatial grid, Grid$\Delta$(x,y)' denotes the normalized difference as the generated second spatial-change grid data, and |max(Grid$\Delta$(x, y))$_{n=1 \ldots n\_max}$| denotes a maximum relative change value as the relative-change value determined among datasets 1 to $n_{max}$ used to generate Grid$\Delta$(x,y).

In some embodiments, the generated spatial-change grid data comprises a priori spatial-change grid data (e.g., to present changes from a priori data set) from the plurality of data sets associated with the plume, wherein the first data set is associated with measurements collected at the first date which occurs at, or after (e.g., immediately follows in measurement sequence or not immediately follow in measurement sequence), a baseline date and the second data set is associated with measurements collected at the second date which immediately follows the first date in measurement sequence.

In some embodiments, the method further includes, in response to determining that each corresponding node of the first spatial grid data and the second spatial grid data both have values less than a baseline concentration, updating, by the processor, the corresponding node of the first spatial grid data and the second spatial grid data to a third value distinguishable (e.g., to remove insignificant changes outside the boundary limit of the plume) to the presentation scale associated with the normalized relative-change value (e.g., to a value of "0").

In some embodiments, each of the first data set and the second data set comprises a generated contaminant concentration isopleth map generated from raw monitoring well data (e.g., the contaminant concentration isopleth map being generated by creating grid mesh array via a gridding operation, e.g., Kriging or Triangulation (e.g., via linear interpolation), from a logarithmic transformed of raw monitoring well data; and performing an inverse log transform of the created grid mesh array.

In some embodiments, the presentation of spatial changes of the plume comprises: a first base color (e.g., red) to denote an increase, a second base color (e.g., blue) to denote a decrease, and no color change denotes either no change or an insignificant change.

In some embodiments, the presentation of spatial changes of the plume comprises: a boundary line that denotes an area of attenuation.

In some embodiments, the plurality of data sets comprise spatial data of plume concentration over an area (e.g., spatial data of plume concentration determined from a contaminant concentration isopleth map).

In some embodiments, the plurality of data sets comprise spatial data of plume mass over an area (e.g., spatial data of plume mass determined from a contaminant concentration isopleth map).

In some embodiments, the first spatial grid data is retrieved from the first data set. In other embodiments, the first spatial grid data is a processed set of data values derived from the first data set.

In some embodiments, the relative-change value is selected from the group consisting of: a determined maximum relative-change value determined from all data associated with the plume; a determined maximum relative-change value determined from some data associated with the plume; and a relative-change value determined from a maximum relative-change value for the plume.

In some embodiments, the method further includes determining, by the processor, a first mass change value (e.g., a mass increase indicator) associated with an increase in plume mass; determining, by the processor, a second mass change value (e.g., a mass decrease indicator) associated with a decrease in plume mass; and causing, by the processor, graphical presentation of the first mass change value and the second mass change value proximal to the graphical presentation (e.g., via a GUI or in a report) of spatial changes.

In another aspect, a system is disclosed of generating a presentation of spatial changes of a plume. The system includes a processor; and a memory having instructions stored thereon, wherein execution of the instructions, cause the processor to: generate a spatial-change grid data from a plurality of data sets (e.g., spatial data of plume concentration over an area or spatial data of plume mass over the area) associated with a plume, wherein the plurality of datasets includes a first data set and a second data set, wherein the first data set is associated with measurements collected at a first date and the second data set is associated with measurements collected at a second date by determining a difference between i) a first spatial grid data e.g., wherein the first spatial grid data is retrieved from the first data set or a processed set of data values derived from the first data set, associated with the first data set and ii) a second spatial grid data associated with the second data set (e.g., on a node-by-node basis) (e.g., by a subtractive operation of the second "subsequent" spatial grid data by the first "prior" spatial grid data); and normalizing based on a relative-change value, the determined difference between the first spatial grid and the second spatial grid (e.g., to optimize the range of the data from presentation) to generate the spatial-change grid data (e.g., wherein the relative-change value is a determined maximum relative-change value determined from all data associated with the site; or a determined maximum relative-change value determined from some data associated with the site; or a relative-change value determined from a maximum relative change value for the site) in which, for each portion of the second spatial grid data determined to have no plume (e.g., wherein the corresponding node values is below the baseline concentration) and a corresponding portion of the first spatial grid data determined to have a plume (e.g., wherein the corresponding nodes values is above the baseline concentration), the corresponding portion of the generated spatial change grid data is updated to a first value distinguishable (e.g., to highlight presence of regions where remediation goals have been met) to a presentation scale associated with the normalized relative-change value (e.g., to a value, $-k$, outside the presentation scale of the normalized data). The instructions, when executed by the processor, further cause the processor to present the spatial changes of a plume based on the generated spatial-change grid data (e.g., in a report or in a graphical user interface of a software application executing on a computing device).

In some embodiments, the instructions, when executed by the processor, further cause the processor to generate a second spatial-change grid data (e.g., to present changes from a baseline data set) from the plurality of data sets associated with the plume, wherein the plurality of datasets includes the first data set and a third data set, wherein the first data set is associated with measurements collected at a first baseline date and the third data set is associated with measurements collected at a third date by determining a second difference between i) the first spatial grid data associated with the first data set and ii) a third spatial grid data associated with the third data set; and normalizing based on a relative-change value, the determined difference between the first spatial grid and the third spatial grid to generate the second spatial-change grid data. The instructions, when executed by the processor, further cause the processor to: cause second graphical presentation of spatial changes of the plume based on the generated second spatial-change grid data.

In some embodiments, the generated spatial-change grid data comprises a priori spatial-change grid data (e.g., to present changes from a priori data set) from the plurality of data sets associated with the plume, wherein the first data set is associated with measurements collected at the first date which occurs at, or after (e.g., immediately follows in measurement sequence or not immediately follow in measurement sequence), a baseline date and the second data set is associated with measurements collected at the second date which immediately follows the first date in measurement sequence.

In some embodiments, the instructions, when executed by the processor, further cause the processor to: in response to determining that each corresponding node of the first spatial grid data and the second spatial grid data both have values less than a baseline concentration, update the corresponding node of the first spatial grid data and the second spatial grid data to a value of 0 (e.g., to remove is insignificant changes outside the boundary of the plume).

In some embodiments, the instructions (e.g., to determine a mass indicator), when executed by the processor, further cause the processor to: determine a first mass change value (e.g., a mass increase indicator) associated with an increase in plume mass; determine second mass change value (e.g., a mass decrease indicator) associated with a decrease in plume mass; and cause graphical presentation of the first mass change value and the second mass change value proximal to the graphical presentation (e.g., via a GUI or in a report) of spatial changes.

In another aspect, a computer readable medium is disclosed. The computer readable medium has instructions stored thereon, wherein the instructions when executed by a processor, cause the processor to: generate a spatial-change grid data from a plurality of data sets (e.g., spatial data of plume concentration over an area or spatial data of plume mass over the area) associated with a plume, wherein the plurality of datasets includes a first data set and a second data set, wherein the first data set is associated with measurements collected at a first date and the second data set is associated with measurements collected at a second date by determining a difference between i) a first spatial grid data associated with the first data set (e.g., wherein the first spatial grid data is retrieved from the first data set or a processed set of data values derived from the first data set) and ii) a second spatial grid data associated with the second data set (e.g., on a node-by-node basis) (e.g., by a subtractive operation of the second "subsequent" spatial grid data by the first "prior" spatial grid data); and normalizing based on a relative-change value, the determined difference between the first spatial grid and the second spatial grid (e.g., to optimize the range of the data from presentation) to generate the spatial-change grid data (e.g., wherein the relative-change value is a determined maximum relative-change value determined from all data associated with the site; or a determined maximum relative-change value determined from some data associated with the site; or a relative-change value determined from a maximum relative change value for the site). The instructions, when executed by the processor, further cause the processor to: present the spatial changes of a plume based on the generated spatial-change grid data (e.g., in a report or in a graphical user interface of a software application executing on a computing device).

BRIEF DESCRIPTION OF THE DRAWINGS

The components in the drawings are not necessarily to scale relative to each other and like reference numerals designate corresponding parts throughout the several views.

DETAILED DESCRIPTION

Figure 1:
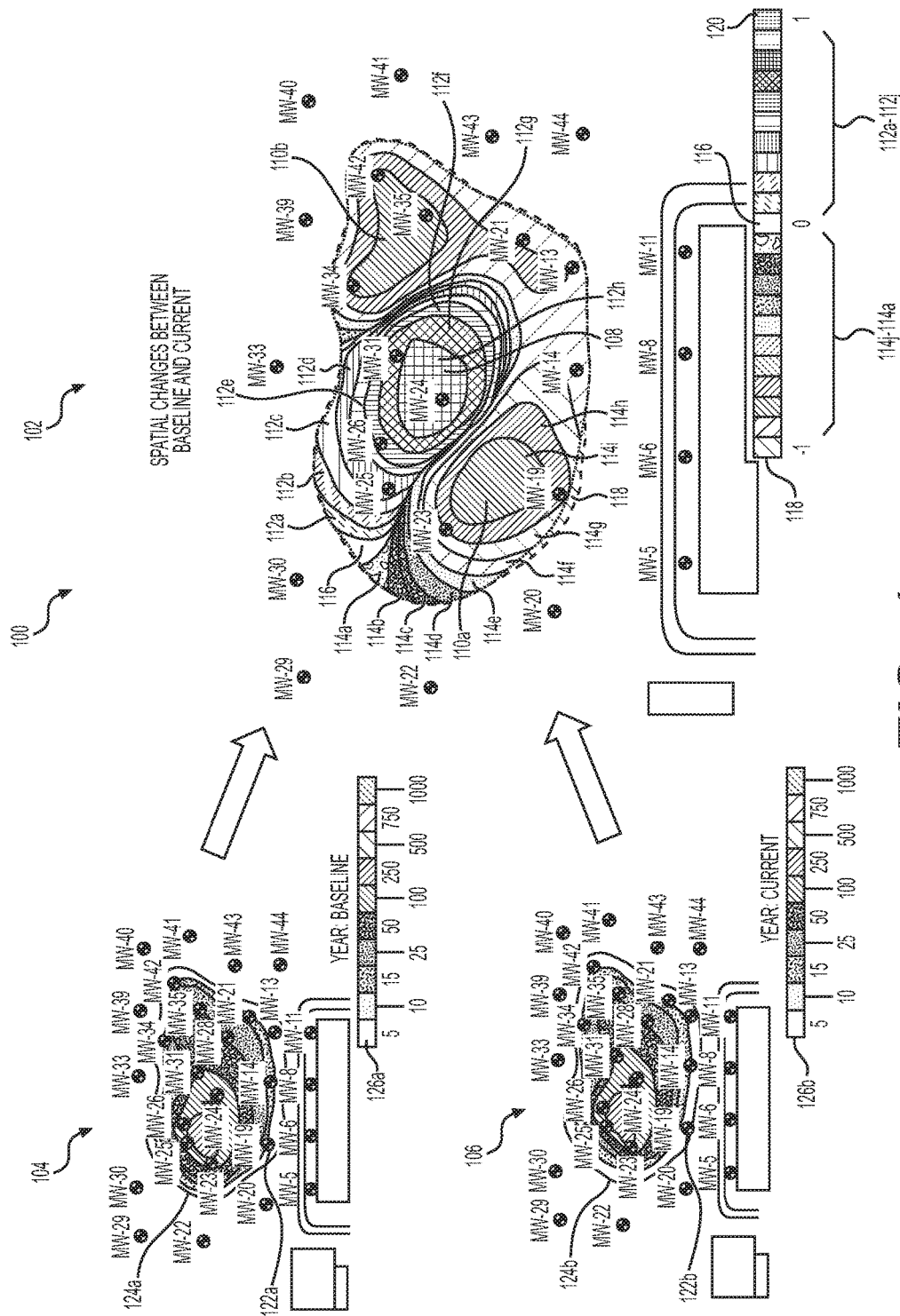
FIG. 1 is a diagram illustrating a presentation generated from an analysis of spatial changes of a plume that facilitates readily identifiable interpretations of subtle, though significant, changes in concentrations or mass of the plume overtime, in accordance with an embodiment.

Unless defined otherwise, all technical and scientific terms used herein have the same meaning as commonly understood by one of ordinary skill in the art. Methods and materials similar or equivalent to those described herein can be used in the practice or testing of the present disclosure.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

It is understood that throughout this specification the identifiers "first", "second", "third", "fourth", "fifth", "sixth", and such, are used solely to aid in distinguishing the various components and steps of the disclosed subject matter. The identifiers "first", "second", "third", "fourth", "fifth", "sixth", and such, are not intended to imply any particular order, sequence, amount, preference, or importance to the components or steps modified by these terms.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

FIG. 1 is a diagram 100 illustrating an exemplified presentation 102 generated from an analysis of spatial changes of a plume (from two datasets, shown as 104 and 106) that facilitates readily identifiable interpretations of subtle, though significant, changes in concentrations or mass of the plume overtime, in accordance with an embodiment. The presentation provides an optimized, or near optimized, normalized-scaling of determined spatial change data while also highlighting areas of interest—for example, in some embodiments, portions of the spatial change data are highlighted to distinguish areas in the plume where remediation goals are met and/or to distinguish areas where plume migration has occurred or where new plume has formed. In FIG. 1, a first dataset 104 (shown as "Year: Baseline") is compared with a second data 106 (shown as "Year: Current") and the difference data is normalized using the exemplified methods to generate the exemplified presentation 102. As shown in FIG. 1, the difference data (namely, spatial change data) is presented with an optimized scaling (or near optimized scaling) to show the spatial change data according to a maximum dynamic range (or near maximum dynamic range) of the observable changes among all the data sets. Within this optimized scaling, gradations of changes in the concentrations are defined and graphically presented to show trends in the changes of concentration. The arrows 108, 110a, and 110b shows areas, for example, corresponding to peak changes in concentration. In addition, areas of interest (e.g., 118, 120) in the difference data are presented that distinguishes these areas from the normalized presentation (i.e., with the optimized or near-optimized scaling). The exemplified presentation has the effect of removing intentional and unintentional bias in the visualization scaling while, at the same time, also improving accuracy and speed of analysis.

In FIG. 1, the gradations are shown in increments of 10 percentile (shown as 112*a*-112*i* for the positive changes in concentration and 114*a*-114*j* for the negative changes in concentration). That is, an area at a first positive gradation 112*a* shows about a 10-percent increase of the observed changes (e.g., 10% of a maximum, or near-maximum, relative change in the analyzed data set); a second area at a second positive gradation 112*b* shows about a 20-percent increase of the observed changes; and so forth (shown as 112*c*-112*i* for the remaining 30-percent positive change to 100-percent positive change). Similarly, an area, at a first negative gradation 114*a* shows about a 10-percent decrease of the observed changes; a second negative area 114*b* shows about a 20-percent decreased of the observed changes; and so forth (shown as 114*c*-114*j* for the remaining 30-percent negative change to 100-percent negative change).

Other levels of gradation besides 10 may be used (e.g., based on 2 levels, 3 levels, 4 levels, 5 levels, 6 levels, 7 levels, 8 levels, 9 levels, 11 levels, 12 levels, 13 levels, 14 levels, 15 levels, 16 levels, 17 levels, 18 levels, 19 levels, or 20 levels) without departing from the spirit of the disclosure. In some embodiments, a number of gradations greater than 20 levels may be used, e.g., about 256, about 512, about 1024, about 2048, about 4048, about 8096, about 16,384, about 32768, about 65536, and etc.

Referring still to FIG. 1, in conjunction with the optimized ranges of the presentation of the change data, the exemplified presentation 102 includes highlighted regions that further distinguish areas having changes of interest—including a first area 118 where remediation goals are met and a second area 120 where plume migration has occurred or where new plume has formed.

In the example of FIG. 1, data shown in the first dataset 104 (shown as "Year: Baseline) includes an area located near monitor well "MW-19" 122*a* that is within the boundary of the plume 124*a*. That is, this area (e.g., 118) near "MW-19" 122*a* has a concentration value that is above a boundary limit of the collected data. Here, the boundary limit is "5" (as shown in scale 126*a*). And, in the second dataset 106 (shown as "Year: Current"), the same area (e.g., 118) located near monitor well "MW-19" 122*b* has shifted and is now outside the boundary of the plume 124 (shown as 124*b* in the dataset 106). That is, this area (e.g., 118) near "MW-19" 122*b* has a concentration value that is less a boundary limit of the collected data (i.e., "5" per scale 124*b*). To this end, the area 118 highlights where remediation is successful—i.e., where data associated with an earlier event shows existence of a plume and at the same location in a later event, the area 118 shows the plume no longer being present. The exemplified presentation 102 in presenting a highlighted region 118 makes the area of successful remediation very apparent while distinguishing the highlighted region (e.g., 118) from other visualization (e.g., visualization of the gradient change data) in the presentation 102.

Referring still to FIG. 1, in conjunction with the optimized ranges of the presentation of the change data, the exemplified presentation 102 further designates areas (shown via 116) that have insignificant changes outside the boundary of the plume.

Referring still to FIG. 1, in conjunction with the graphical output of the presentation 102, quantitative changes (e.g., for mass change indications) can be calculated and presented to augment the presentation. These changes are calculated as the mass increase indicator and mass decrease indicator, which directly correlate to the positive and negative color gradations respectively. In some embodiments, a mass change indicator is calculated. In addition, overall changes in area, average concentration, and mass indicator can be determined and presented. The mass change indicator, mass increase indicator, or mass decrease indicator can be used provide a context for the interpretation of the specific spatial information in the visualization.

The exemplified presentation and methods facilitate a user in readily interpreting the changes in a concentrations of a plume over a large region—in which areas of decrease concentration are indications of attenuation in a plume, while areas of little to no change indicate a lack of attenuation, and areas of increase may indicate possible sourcing of the plume. Areas of decrease concentration, among other things, help the user identify the effects of a remedial process, of a plume migration, of a natural attenuation, or identify presence of unknown causes. These decreases may then be used to provide lines of evidence to support, e.g., remedial system termination, monitored natural attenuation, risk-based site closure, and other like actions. Conversely, areas of increase concentration, among other things, may help the user to identify the effects of plume consolidation, of additional sourcing, of plume migration, or of presence of unknown effects yet to be identified. Notably, these areas of increase concentration may help the user in focusing remedial efforts, in altering the course of a remedial plan, in making more effective site-management decisions, in prompting further investigation and modification/addition of monitoring wells, and other like actions. In large plumes, the exemplified presentations and methods may facilitate identification of regional hot spots over a large land area. In small and large plumes alike, different areas of the plume may be increasing while other areas are decreasing in concentration. By identifying those areas that are increasing, a practitioner can better identify a more specific area that can be addressed through remedial activities instead of trying to address the entire plume.

Figure 2:
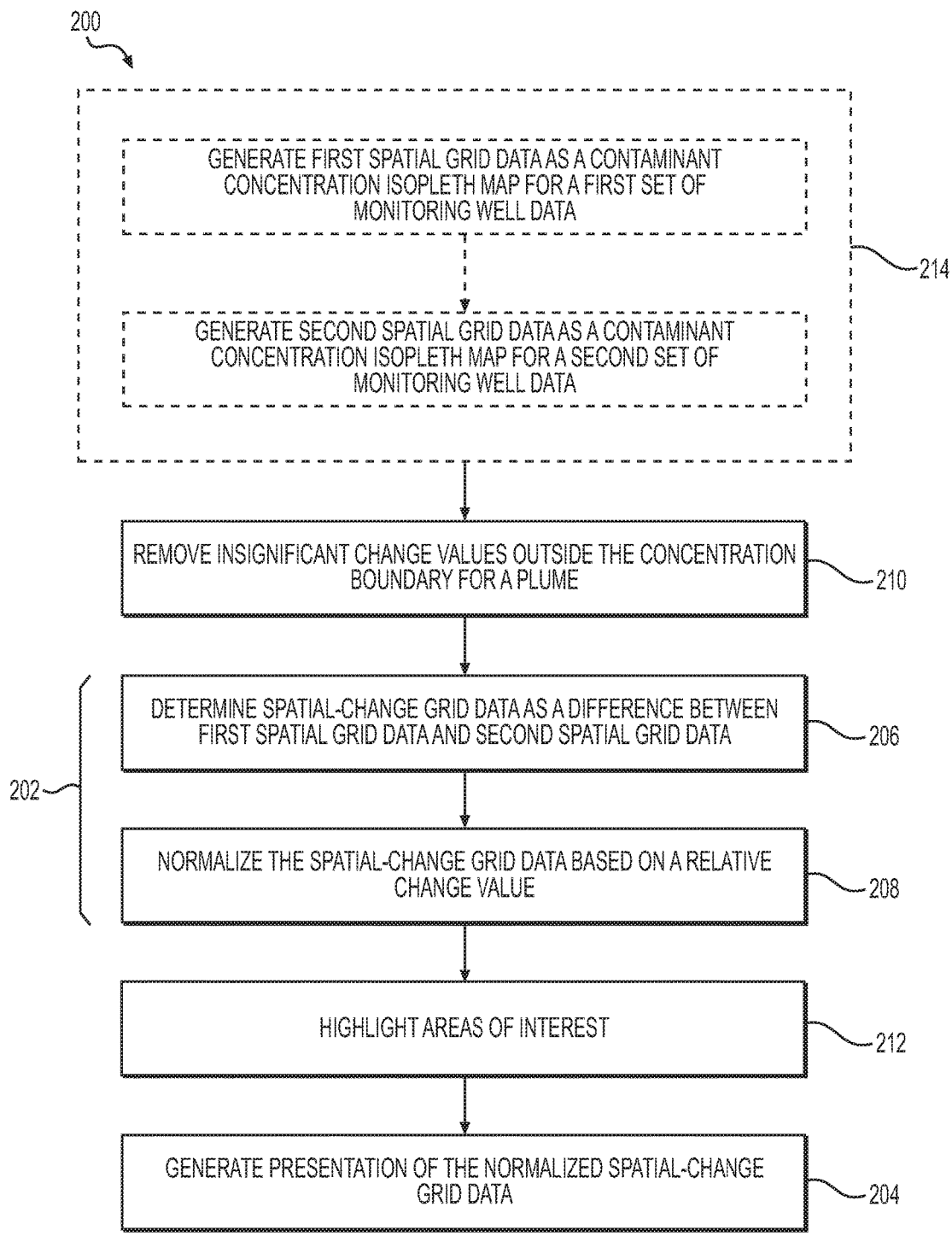
FIG. 2 is a flowchart of a method of determining spatial changes of a plume and generating an optimized, normalized plot thereof with areas highlighted to distinguish specific changes of interest in the plume, in accordance with an illustrative embodiment.

FIG. 2 is a flowchart of a method 200 of determining spatial changes of a plume and generating an optimized, normalized plot thereof with highlighted areas that distinguish specific changes of interest in the plume, in accordance with an illustrative embodiment. Variations of method 200 can be used to determine the changes either cumulatively (from a baseline event to each later event—See FIG. 3) or sequentially (from one event to the next—see FIG. 3).

Referring to FIG. 2, the method 200 includes generating (202), by a processor, a spatial-change grid data (e.g., to evaluate spatial-changes of a plume) from a plurality of data sets associated with the plume. Spatial-change grid data, as used herein, refers to normalized data of changes from two data sets. The Spatial-change grid data are organized and/or formatted accordance to a grid, array, or the like, e.g., as an isopleth map. The Spatial-change grid data is preferably a 2-dimensional data, though can be three-dimensional or more.

The plurality of datasets includes a first data set and a second data set, wherein the first data set is associated with measurements collected at a first date and the second data set is associated with measurements collected at a second date.

Referring still to FIG. 2, the method 200 includes causing (204) presentation of spatial changes of a plume based on the generated spatial-change grid data (e.g., in a report or in a graphical user interface of a software application executing on a computing device). In some embodiments, the first and second data sets are organized in a similar structure as the spatial-change grid data, e.g., as an isopleth map or the like. In other embodiments, the first and second data sets are raw data collected from monitoring wells that are converted and/or transform to the structure of the spatial-change grid data.

Referring still to FIG. 2, the operation of generating (202) the spatial change grid data includes determining (206), by the processor, a difference between a first spatial grid data associated with the first data set and a second spatial grid data associated with the second data set and normalizing (208), based on a relative-change value, the determined difference between the first spatial grid and the second spatial grid to generate the spatial-change grid data. That is, two spatial grid data are subtracted from each other using Equation 1:

$$\text{Grid}\Delta(x,y) = \text{Grid}_{t2}(x,y) - \text{Grid}_{t1}(x,y), \text{ for } x=1 \ldots x_{max},$$
$$y=1 \ldots y_{max} \quad \text{(Equation 1)}$$

where $\text{Grid}_{t1}(x,y)$ is the first spatial grid data for a grid $x_{max}$ by $y_{max}$, and $\text{Grid}_{t2}(x,y)$ is the second spatial grid data for a grid $x_{max}$ by $y_{max}$, and where the first spatial grid data is associated with an earlier event as compared to that of the second spatial grid data. It is contemplated that a difference operation can include a division operation when the data is formatted in logarithmic scale.

The resulting difference $\text{Grid}\Delta(x, y)$ is a pre-normalized difference grid, which contains positive values where concentrations have increased, and negative values where concentrations have decreased. The normalize step (208) includes normalizing each node of the pre-normalized difference grid based on a relative change value. In some embodiments, the relative change value is a maximum relative change for the data being analyzed. That is, changes between each event data and the baseline data is determined on a node-by-node basis and an absolute value of the maximum value of that determined changes among the data analyzed is used for the normalization of the data. In some embodiments, each node of the pre-normalized difference grid is divided by the maximum change value for the site, as shown in Equation 2.

$$\text{Grid}\Delta(x, y)' = \frac{\text{Grid}\Delta(x, y)}{|\max(\text{Grid}\Delta(x, y))_{n=1 \ldots n\_max}|} \text{ for } x = 1 \ldots x_{max}, \quad \text{(Equation 2)}$$
$$y = 1 \ldots y_{max}$$

The maximum change value, in some embodiments, is a largest absolute value found among all the comparison events (e.g., where $n_{max}$ is a number of comparison events). Equation 2 can be used for either a cumulative change analysis or for a successive change analysis. For a cumulative change analysis, changes between each of the event data and the baseline data is calculated (on a node-by-node basis) to produce a set of change datasets, and a maximum value of all of the set of change datasets is used in the normalizing step, so $n_{max}$ is a number of event data. For a successive change analysis, a comparison is only performed between two event data, so $n_{max}$ is 2. This operation transforms all the spatial change values in each comparison event to fit a scale from −1 to 1 (or −100% to 100%). This operation (208) removes any intentional, or unintentional, user bias in scaling of the visualization in providing optimized viewing of cumulative changes to the baseline event and in viewing optimized local changes between successive events. Other scale can be used, e.g., 0 to 1, and etc.

The pre-normalized difference grids are created for each comparison event n in the collection of data sets. For example, for a baseline analysis of spatial change (e.g., corresponding to FIG. 3), if the collection of data sets contains five events ($\text{event}_1$ to $\text{event}_5$), four (4) spatial change grid data would be generated (namely, between $\text{event}_1$ and $\text{event}_2$, between $\text{event}_1$ and $\text{event}_3$, between $\text{event}_1$ and $\text{event}_4$, and between $\text{event}_1$ and $\text{event}_5$). To this end, spatial changes between each of the event data (event to event s) and the baseline data ($\text{event}_1$) is calculated on a node-by-node basis to produce a set of change datasets, and a maximum change value of the set of change datasets are used to as in the normalizing step (namely, $n_{max}=4$). For a successive spatial change analysis, comparison is only performed between two event data, so $n_{max}$ is always 2.

And, for a successive analysis of spatial changes (e.g., corresponding to FIG. 4), if the collection of data sets also contains five events ($\text{event}_1$ to $\text{event}_5$), four (4) spatial change grid data would be generated (namely, between $\text{event}_1$ and $\text{event}_2$, between $\text{event}_2$ and $\text{event}_3$, between $\text{event}_3$ and $\text{event}_4$, and between $\text{event}_4$ and $\text{event}_5$). In this example, there are four successive analyses, each having its own maximum change value. That is, each change data set from two event data are normalized by the maximum change value determined from only that two event data (in this example, there would be four maximum change values, one for each of the four analyses).

In some embodiments, an operation (210) is performed to remove insignificant change-values outside the concentration boundary for a given plume. The operation 210, in some embodiments, includes determining if a given node of each of the inputted spatial grid data has a value less than a boundary limit (namely, a baseline concentration) and updating the node value to pre-defined insignificant value (e.g., "0") when it meets such criterion. To this end, if a node in either of the inputted spatial grid data is above the boundary limit, then the value for that node is retained in both spatial grid data. This operation prevents the analysis, and the subsequent presentation, of insignificant changes outside the boundary limit of a plume. One implementation example is shown in Equation 3.

If (node($x,y$) of grid $B$)<$BL$ AND if (node($x,y$) of grid $A$<$BL$), then node($x,y$) of grids $A$ and $B$=0 (Equation 3)

Referring still to FIG. 2, in some embodiments, an operation (212) is performed to create highlighted regions in the data that distinguish regions of interest such as an area where remediation goals are met or an area where a plume has migrated or a new plume is introduced. To generate the highlighted regions that denote a successful remediation goal, the operation 212, in some embodiments, includes determining, for each node, if an area in a prior-event spatial grid data set shows a plume being present (e.g., where a node has a value that is greater than, or equal to, a boundary limit value) and if the same area in a later-event spatial grid data set shows the plume not being present (e.g., where the same node has a value that is less than the boundary limit value), and updating the value of the node to a first value distinguishable to the normalized scaling (e.g., where the first value=$k_1$ which is preferably outside the normalized scaling range). This is, for example, shown in Equation 4.

To generate the highlighted regions that denote a plume migration or a new plume, the operation 212, in some embodiments, includes determining, for each node, if an area in the prior-event spatial grid data set shows a plume not being present (e.g., where a node has a value that is less than a boundary limit value) and if the same area in a later-event spatial grid data set shows the plume being present (e.g., where the same node has a value that is greater than, or equal to, the boundary limit value), and updating the value of the node to a second value distinguishable to the normalized scaling (e.g., where the second value=$k_2$ which is preferably outside the normalized scaling range). This is, for example, shown in Equation 5. In some embodiments, $k_1$ and $k_2$ are the same, but inverse number of one another. Other values of $k_1$ and $k_2$ can be used so long as they are distinguishable to the normalized scaling range and to each other.

If node($x,y$) of grid $B<BL$ AND if node($x,y$) of grid $A \geq BL$, then Grid$\Delta$(node($x,y$))=$k_1$   (Equation 4)

If node($x,y$) of grid $B \geq BL$ AND if node($x,y$) of grid $A<BL$, then Grid$\Delta$(node($x,y$))=$k_2$   (Equation 5)

The highlighting operation distinguishes regions of interest that may otherwise be lost to interpretation when viewed only a spatial grid changes.

It is contemplated that other operations may be performed between the operation 210 and 206. It is also contemplated that other operations may be performed between operations 208 and 212 and between operations 212 and 204 without departing from the spirit of the disclosure. In addition, the sequences shown is only for illustration. The sequence may be changes without departing from the spirit of the disclosure.

Referring still to FIG. 2, and as stated above, the first spatial grid data is generated from a first data set (which is associated with measurements collected at a first date) and the second spatial grid data is generated from a second data set (which is associated with measurements collected at a second date). The first and second spatial grid data are organized in a similar structure to the spatial-change grid data, e.g., as an isopleth map or the like. In some embodiments, the first and second data sets are raw data collected from monitoring wells that are converted and/or transform to the structure of the spatial-change grid data. In other embodiments, the first and second data sets are retrieved in a similar structure as the spatial-change grid.

In some embodiments, the operation (214) of generating a spatial grid data from raw data collected from monitoring wells may include creating grid mesh array from a logarithmic transformed of raw monitoring well data; performing an inverse log transform of the created grid mesh array; and performing an interpolation of the inverse grid mesh array. This method is part of the Ricker Method® plume stability analysis. Further details of the Ricker Method® plume stability analysis is discussed in *J. Ricker*, "A Practical Method to Evaluate Ground Water Contaminant Plume Stability," 28 Ground Water Monitoring and Remediation, no. 4, pages 85-94 (2008), which is incorporated by reference herein in its entirety.

Cumulative Spatial-Change Analysis

Figure 3:
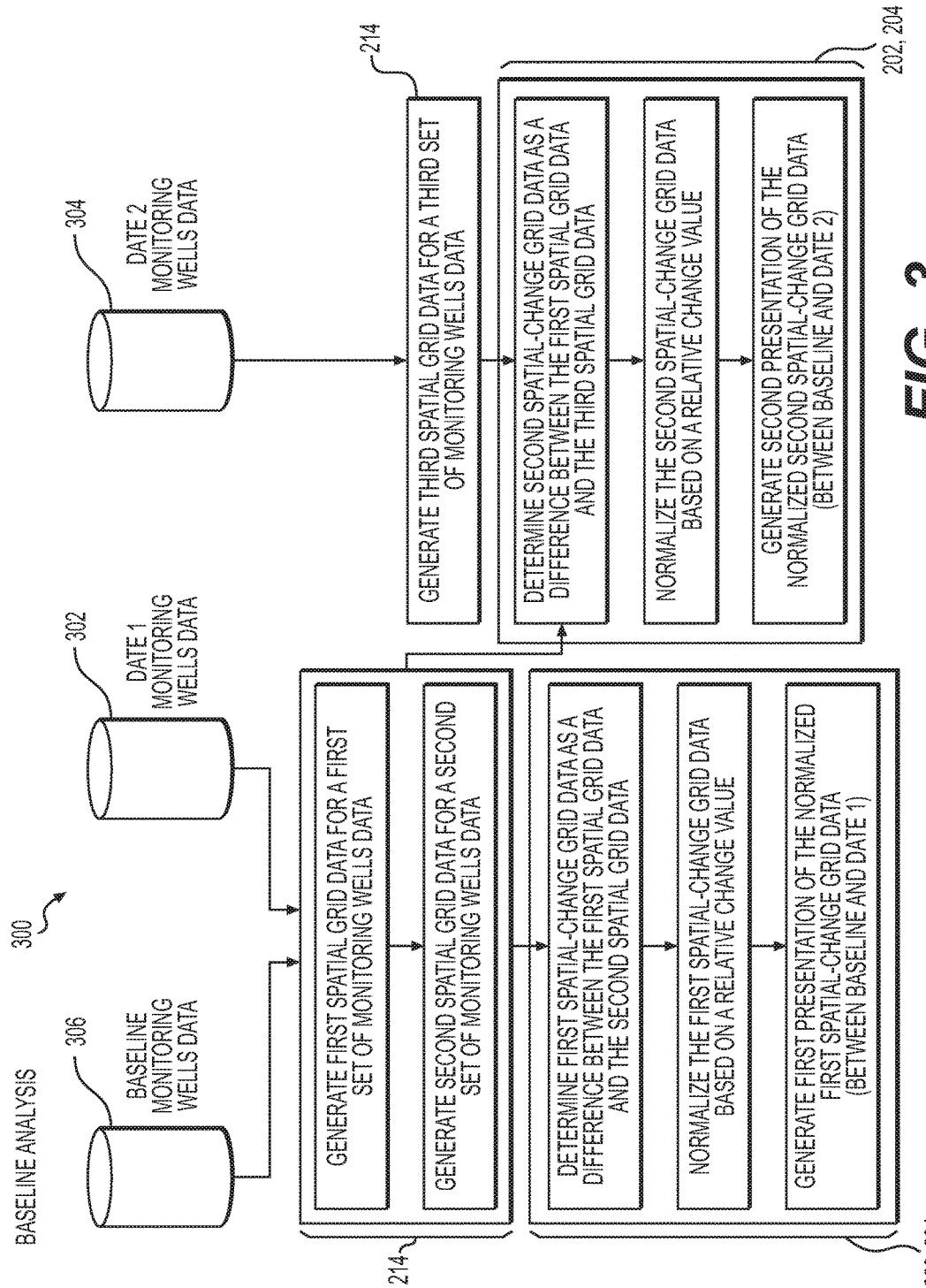
FIG. 3 illustrates a flowchart of a method of determining cumulative spatial changes of a plume by evaluating successive data sets to a baseline dataset and generating normalized plots of the cumulative spatial changes, in accordance with an illustrative embodiment.
Figure 4:
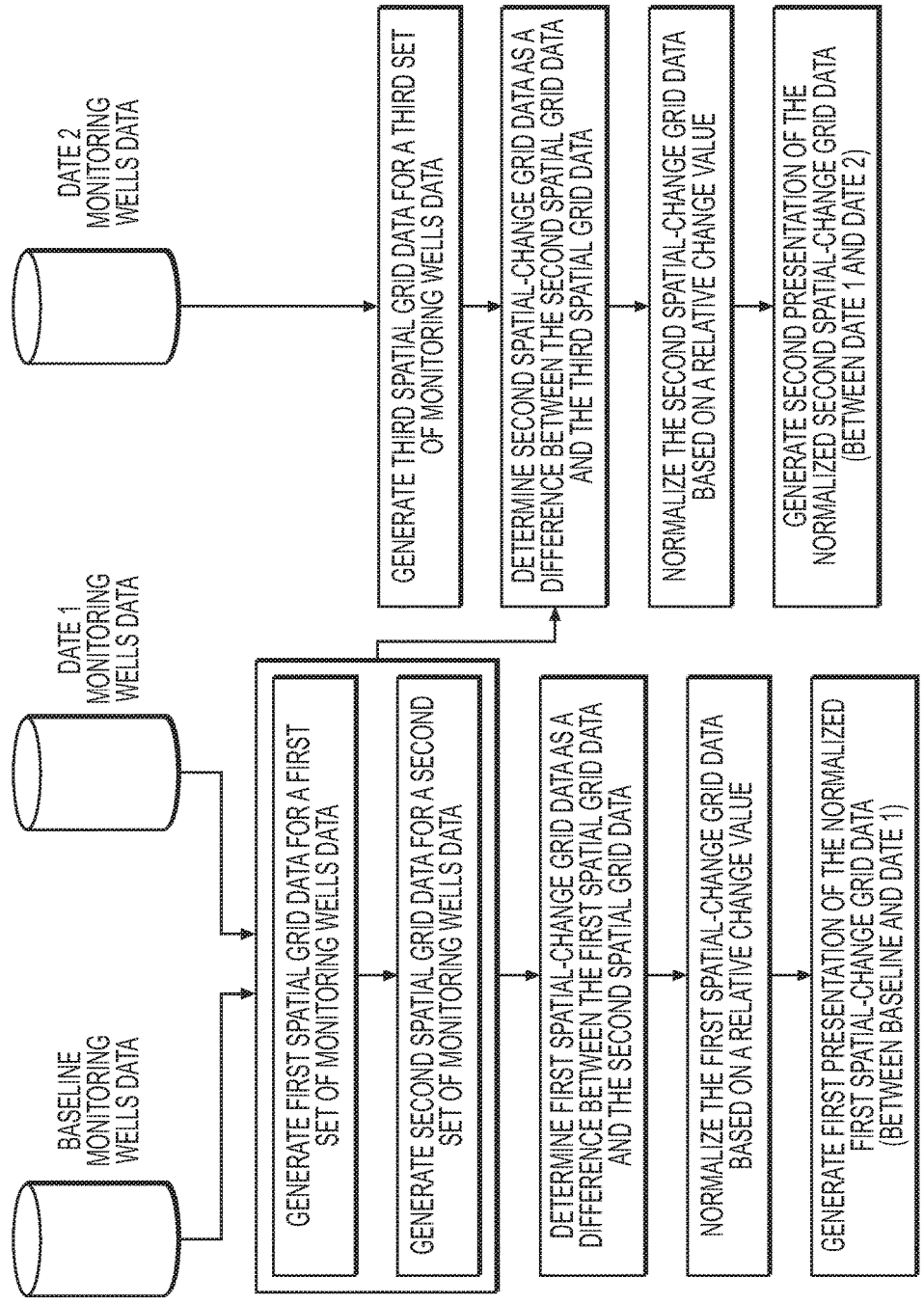
FIG. 4 illustrates a flowchart of a method of determining successive spatial changes of a plume by evaluating successive data sets to its prior data set and generating normalized plots of the successive spatial changes, in accordance with an illustrative embodiment.

FIG. 3 illustrates a flowchart of a method 300 of determining cumulative spatial changes of a plume by evaluating successive data sets to a baseline dataset and generating normalized plots of the cumulative spatial changes, in accordance with an illustrative embodiment. FIG. 4 illustrates a flowchart of a method 400 of determining successive spatial changes of a plume by evaluating successive data sets to its prior data set and generating normalized plots of the successive spatial changes, in accordance with an illustrative embodiment.

As shown in FIG. 3, a cumulative spatial-change analysis includes performing multiple spatial-change analysis (e.g., at least 202, 204, and 212) as discussed in relation to FIG. 2 in which each successive spatial grid data set (shown as "Monitoring wells data" 302 and 304) is evaluated against a baseline spatial grid data set (shown as "Baseline—Monitoring wells data" 306). Each of the multiple spatial-change analysis are normalized to a same normalization value to produce an optimized, or near optimized, scaling in the presentation of the spatial change data. In addition, highlighted regions are generated to distinguish changes of interest (e.g., via operation 212) in the spatial change data.

Referring now to FIG. 3, a first spatial grid data and a second spatial grid data are retrieved (or generated) (e.g., 214) as discussed in relation to FIG. 2. The first spatial grid data is associated with the baseline well data 306, and the second spatial grid data is associated with the first well data 302. Operation 202 is performed on the first spatial grid data and the second spatial grid data to generate a first spatial-change grid data. A second operation 202 is performed on the first spatial grid data and a third spatial grid data (which may be retrieved or generated) to generate a second spatial-change grid data. Each of the first and second spatial-change grid data are then presented (e.g., 204). In a similar manner, each additional well data in which spatial grid data associated with each well data (is either retrieved or generated) is evaluated, via operation 202, against the first spatial grid data to generate another spatial-change grid data.

Figure 5:
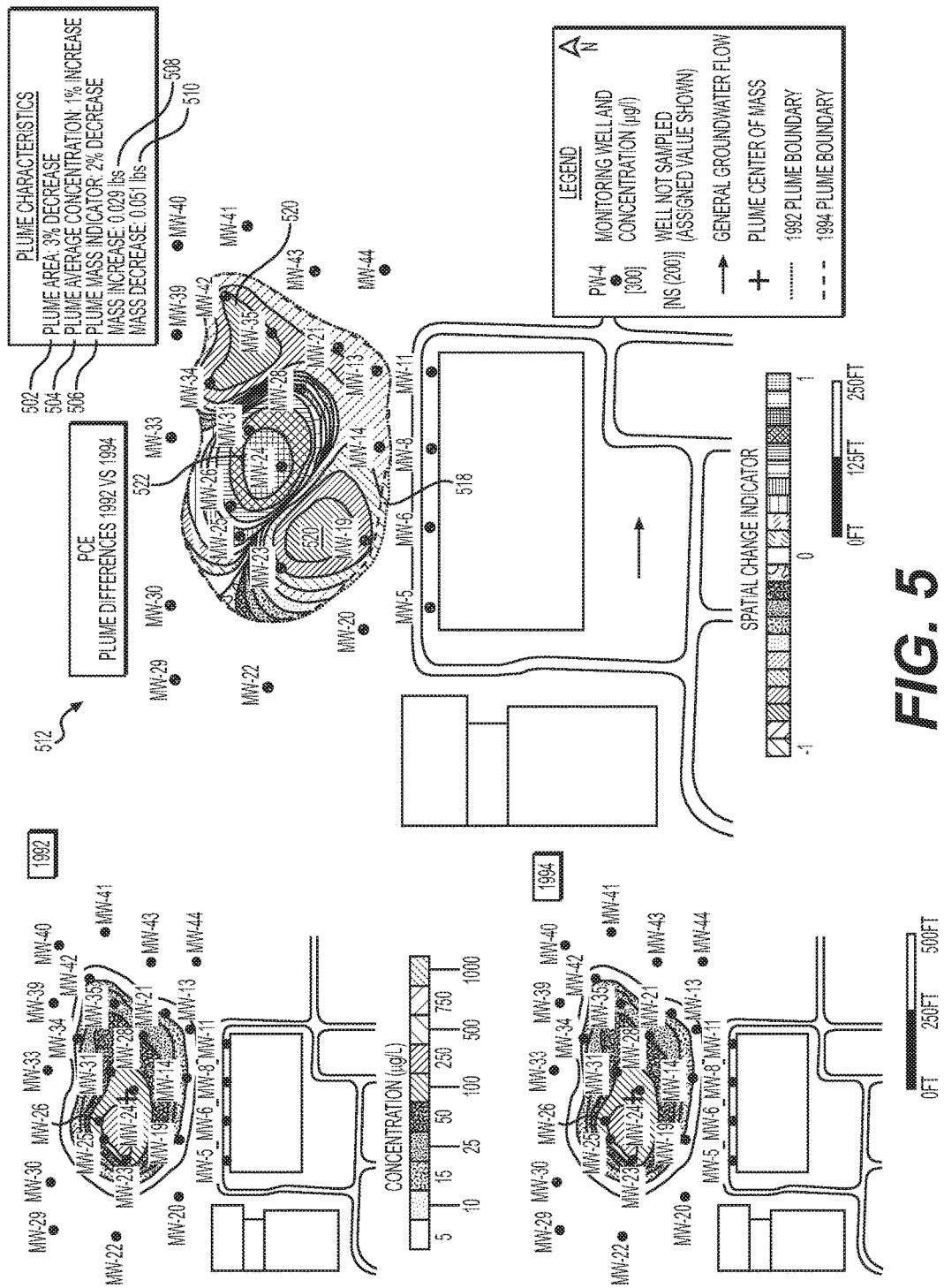
FIGS. 5-7 are three example cumulative spatial-change analyses, in accordance with an illustrative embodiment.
Figure 6:
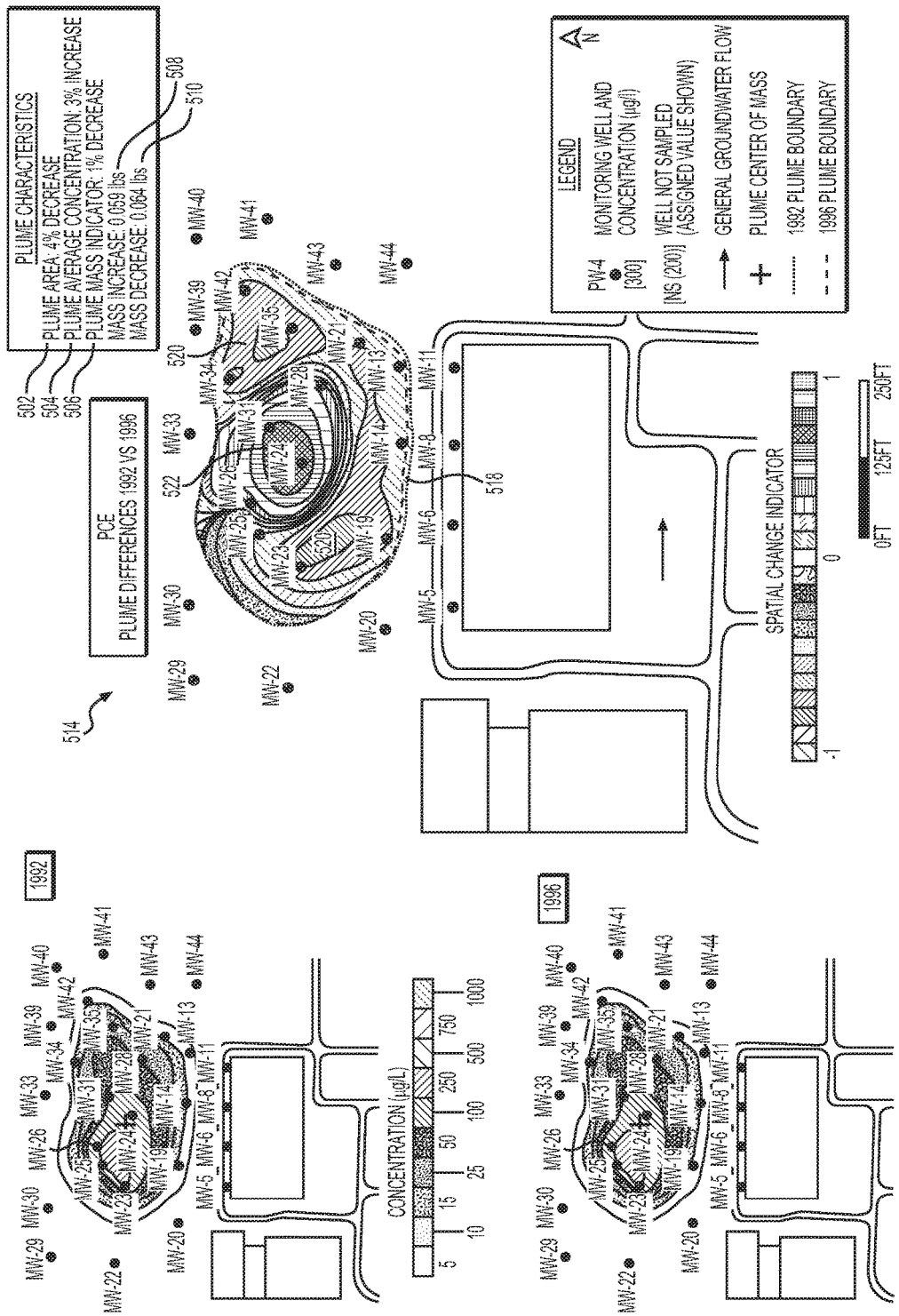
Figure 7:
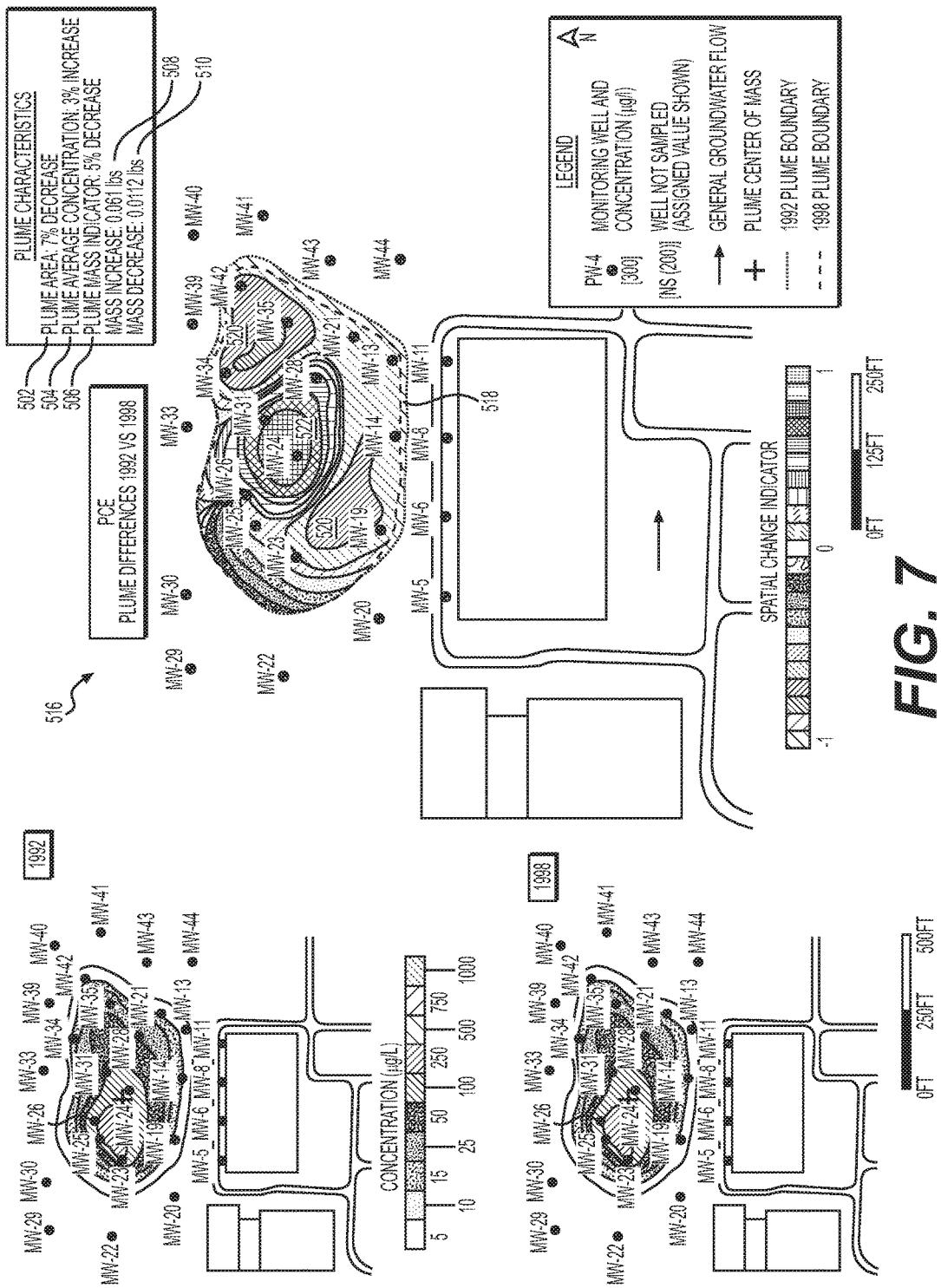

FIGS. 5-7 are three separate example cumulative spatial-change analyses, for example, as described in relation to FIG. 3, in accordance with an illustrative embodiment. In FIG. 5, a first spatial-change analysis is performed between a first spatial grid data (shown as the baseline, year "1992") and a second spatial grid data (shown as year "1994") to produce presentation 512. In FIG. 6, a second spatial-change analysis is performed between the first spatial grid data (i.e., the baseline, year "1992") and a third spatial grid data (shown as year "1996") to produce presentation 514. In FIG. 7, a third spatial-change analysis is performed between the first spatial grid data (i.e., the baseline, year "1992") and a fourth spatial grid data (shown as year "1998") to produce presentation 516.

Referring still to FIGS. 5-7, each spatial-change analysis facilitates presentation of other metrics such as change in area, change in average concentration, and change in mass indicator. The change in area (shown as "Plume Area: 3% decrease" 502 in FIG. 5) is shown as a percentage of change. The change in average concentration (shown as "Plume Average Concentration: 1% Increase" 504 in FIG. 5) is shown as a percentage of change. The change in mass indicator (shown as "Plume Mass Indicator": 2% Decrease" 506 in FIG. 5) is shown as a percentage of change. The change in mass increase indicator (shown as "Mass Increase: 0.029 lbs" 508 in FIG. 5) is shown in mass unit. The change in mass decrease indicator (shown as "Mass Decrease: 0.051 lbs" 510 in FIG. 5) is shown in mass unit. Because the resultant net of the mass increase indicator and the mass decrease indicator are negative—a user may interpret this data as an attenuation of the plume. These additional metrics supplement the graphical information with readily identifiable scores.

In viewing each of FIGS. 5 through 7, it is observed that the volume of the plume is decreasing, that the average concentration is increasing, and that the mass of the plume is decreasing. These observations in combination support a conclusion that the plume is collapsing on itself towards a center region of the plume. Specifically, the mass indicator 508 from each of FIGS. 5 to 7 shows that the change in mass indicator is negative. In viewing the areas around the border of the plume decreasing (e.g., at the plume boundary 518 and at the plume region 520) and the area of at the center of the plume increasing in concentration (e.g., at the plume region 522), a collapse of the plume can be observed in which the center of the plume is drawing in contaminant from the edges of the plume.

Possible causes of the changes that are supported by the observation includes presence of a diffusive gradient, presence of a pumping well in the middle of the plume that may be pulling the plume to its center, among other reasons.

Successive Spatial-Change Analysis

Referring now to FIG. 4, a successive spatial-change analysis includes performing multiple spatial-change analysis as discussed in relation to FIG. 2 in which each successive spatial grid data set (shown as "Monitoring wells data" 302 and 304) is evaluated against a prior spatial grid data set (including monitoring well data 302 and baseline well data 306, for this example). The successive spatial-change analysis facilitates presentation of relative change in concentration over time. Each successive spatial-change analysis are normalized to a normalization value specific to the two data sets used in the analysis to produce an optimized, or near optimized, scaling in the presentation of the spatial change data. In addition, highlighted regions is generated to distinguish changes of interest in the spatial change data.

Figure 8:
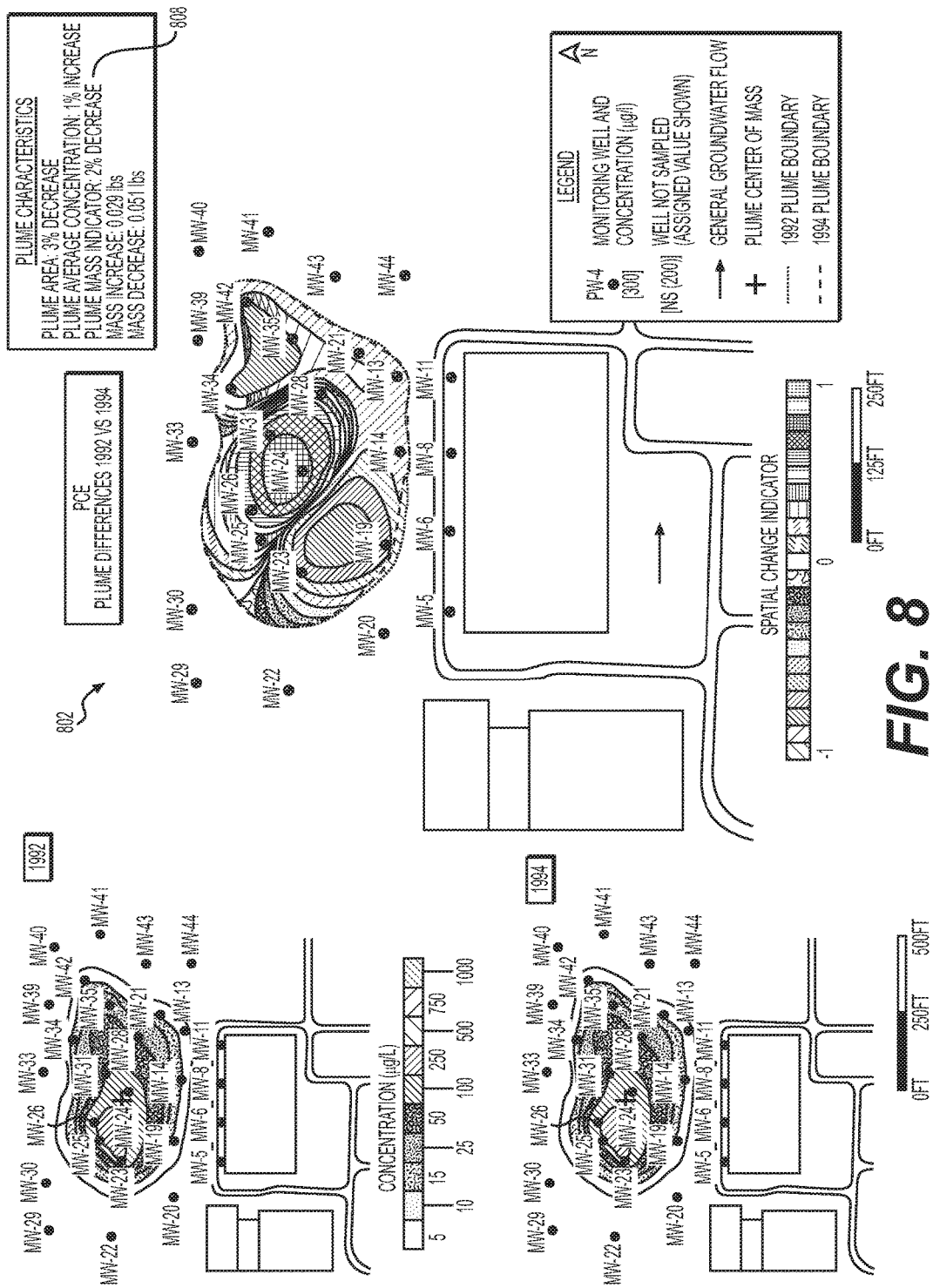
FIGS. 8-10 are three example successive spatial-change analyses, in accordance with an illustrative embodiment.
Figure 9:
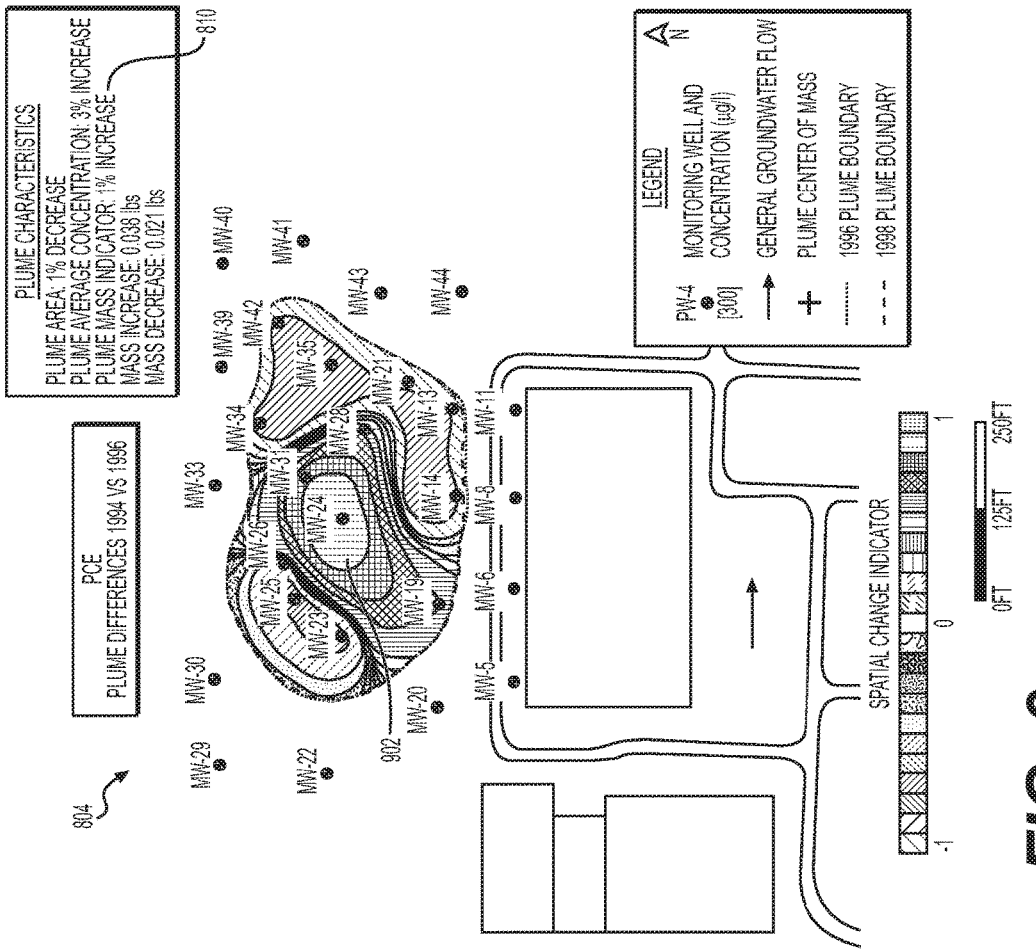
Figure 9:
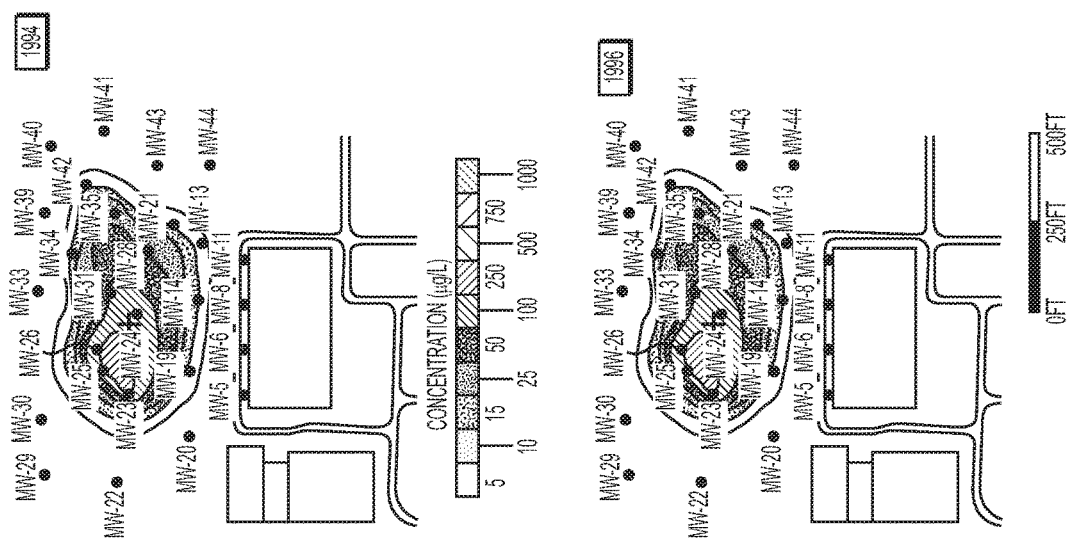
Figure 10:
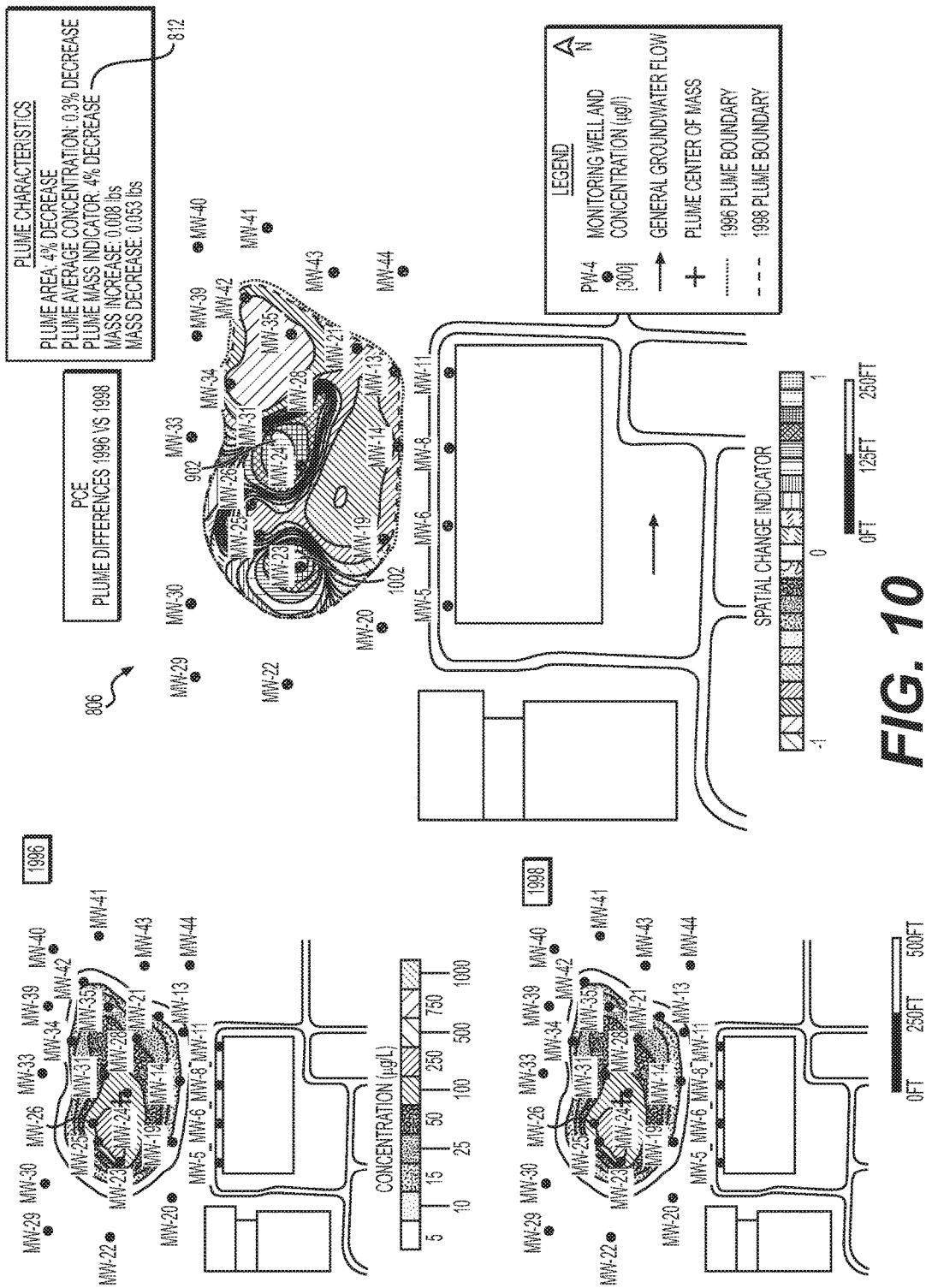

FIGS. 8-10 are three example outputs of the successive spatial-change analyses, for example, as described in relation to FIG. 4, in accordance with an illustrative embodiment. FIG. 8, a first spatial-change analysis is performed between a first spatial grid data (shown as the baseline, year "1992") and a second spatial grid data (shown as year "1994") to produce presentation 802. In FIG. 9, a second spatial-change analysis is performed between the second spatial grid data (i.e., year "1994") and a third spatial grid data (shown as year "1996") to produce presentation 804. In FIG. 10, a third spatial-change analysis is performed between the third spatial grid data (i.e., year "1996") and a fourth spatial grid data (shown as year "1998") to produce presentation 806.

Mass Increase Indicator and Mass Decrease Indicator

In another aspect, quantitative changes can be calculated that represent changes in mass indicator (e.g., 506, 508, 510, 808, 810, 812) throughout the plume. These changes are separately calculated, in some embodiments, as a mass increase indicator and as a mass decrease indicator and directly correlate to the positive and negative color gradations respectively. By generating separate mass indicators for positive changes and for negative changes, effects of regional and/or local hotspots of mass increases and mass decreases may be identified.

For example, in a cumulative spatial change analysis shown in FIG. 7, the mass increase indicator shows a "Mass Increase: 0.061 lbs" 508, and the mass decrease indicator is shown as "Mass Decrease: 0.112 lbs" 510 between the baseline data of year 1992 and the next data collection year 1998. Because both change in the increase and the decrease of mass indicator are negative—a user may interpret this data as an attenuation of the plume.

In a successive spatial change analysis shown in FIG. 9, the mass change indicator (810, 812) shows inflections in the trend of the mass indicator. Because changes in the mass indicator is positive, a user may interpret this data as remediation not working effectively enough or that a growing source of contaminant is present.

Figure 11:
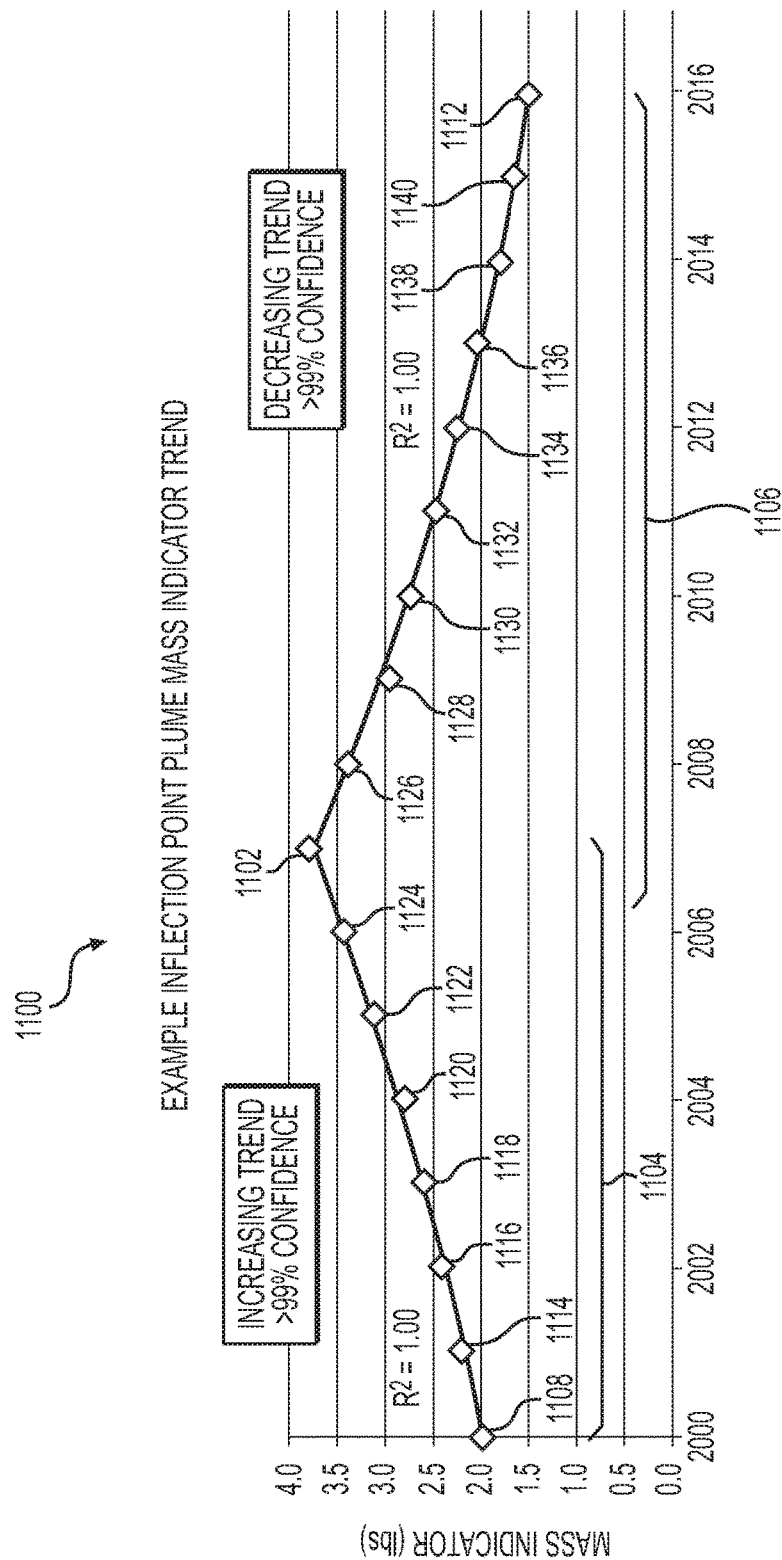
FIG. 11 illustrates a diagram of a plume mass indicator trend that can be used to determine baseline data sets for subsequent cumulative spatial change analyses, in accordance with an illustrative embodiment.

FIG. 11 illustrates a diagram 1100 of a plume mass indicator trend 1102 that can be used to determine baseline data sets for subsequent cumulative spatial change analyses, in accordance with an illustrative embodiment. In some embodiments, the cumulative spatial change analysis is performed over a constant trend in the plume until an inflection in the trend is observed. In some embodiments, the trend is based on a mass indicator of the plume, the concentration of the plume, the areal of the plume, among others. An inflection point as used herein is identified as a significant, sustained change in the trend of any metric, or at the discretion of the practitioner. The number of data sets to establish a trend may vary depending on many factors associated with the measurement or the data itself (e.g., frequency of sampling, degree/magnitude of change, known changes introduced to system, etc). Once an inflection point is identified, it can be used as the baseline data set used to compare all later data sets, or until the practitioner determines otherwise.

Referring to FIG. 11, in some embodiments, inflections (shown as 1102) in the mass indicator trend is first determined. In some embodiments, trend of area, trend of concentration, among others, can be used. In some embodiments, a set of cumulative spatial change analyses (e.g., as described in relation to FIGS. 3 and 5-7) is performed between a baseline data set and a sets of data having a generally constant and continuous trend, e.g., shown as 1104 and 1106. In this example, two cumulative spatial change analyses (e.g., 1104 and 1106) may be performed between the baseline data set 1108 and the determined inflection point 1102 and between the determined inflection point 1102 and the end of the data set 1112. In the first cumulative spatial change analysis 1104, an analysis may be performed between the baseline 1108 and each data set (e.g., 1114-1124) up to the inflection point 1102. That is, a spatial change presentation 102 may be generated by comparing, e.g., between 1108 and 1114; between 1108 and 1116; between 1108 and 1118; between 1108 and 1120; between 1108 and 1122; between 1108 and 1124; and between 1108 and 1102, as part of the first cumulative spatial change analysis 1104. In the second cumulative spatial change analysis 1106, an analysis may be performed between the new baseline 1102 and each data set (e.g., 1126-1140) up to the data set 1112. That is, a spatial change presentation 102 may be generated by comparing, e.g., between 1102 and 1126; between 1102 and 1128; between 1102 and 1130; between 1102 and 1132; between 1102 and 1134; between 1102 and 1136; between 1102 and 1138, and between 1102 and 1140, as part of the second cumulative spatial change analysis 1106. Other cumulative spatial change analysis or successive spatial change analysis (e.g., as described in relation to FIGS. 4 and 8-10) can be performed per the discretion of the practitioner.

Examples of processes to generate the mass indicator trend is described in *J. Ricker*, "A Practical Method to Evaluate Ground Water Contaminant Plume Stability," 28 Ground Water Monitoring and Remediation, no. 4, pages 85-94 (2008), which is incorporated by reference herein in its entirety.

Example Operation

Figure 12:
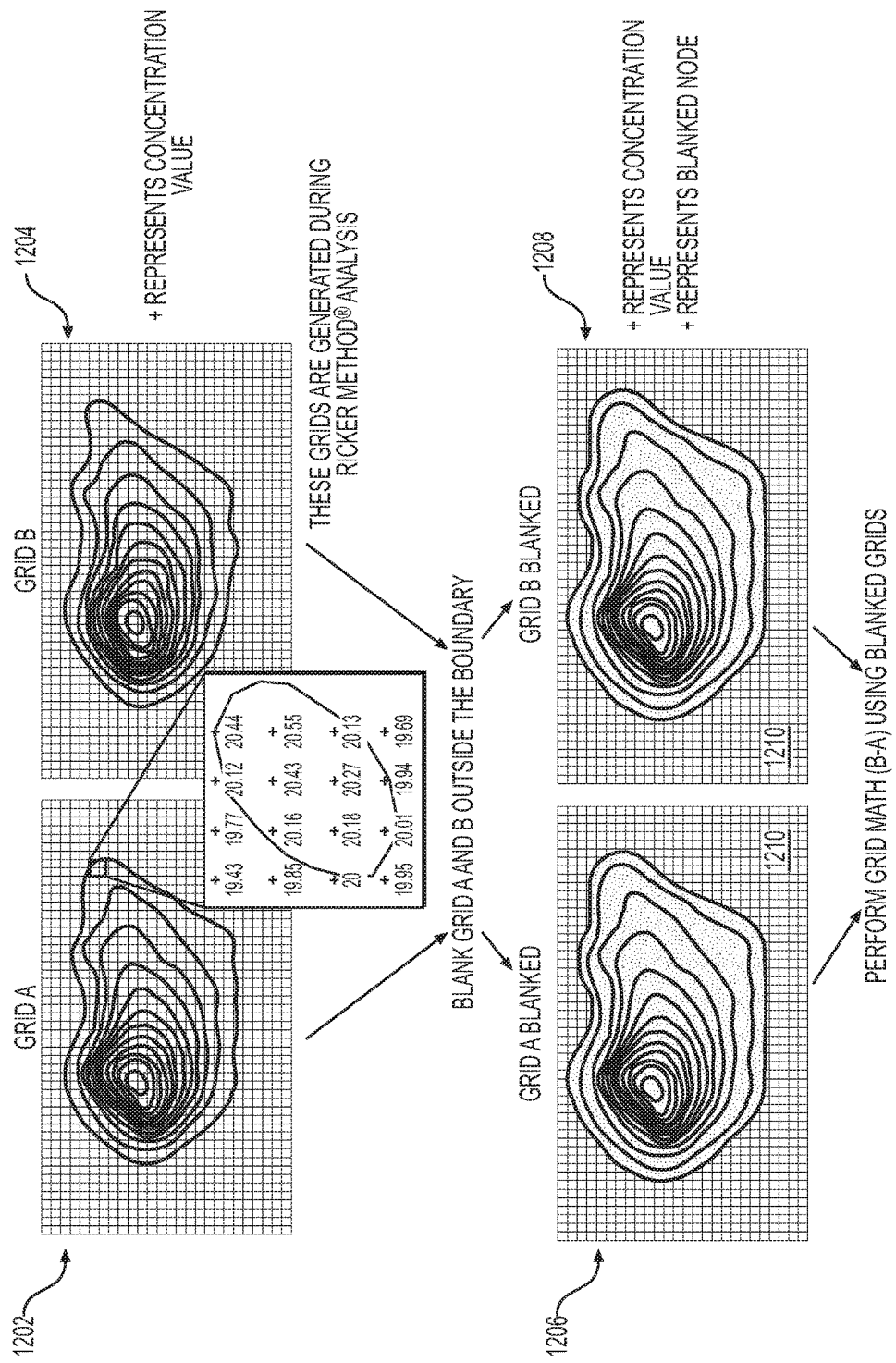
FIG. 12 illustrates the exemplified method of determining the spatial-change grid data and of calculating the mass increase indicator and the mass decrease indicator, in accordance with an illustrative embodiment.
Figure 12:
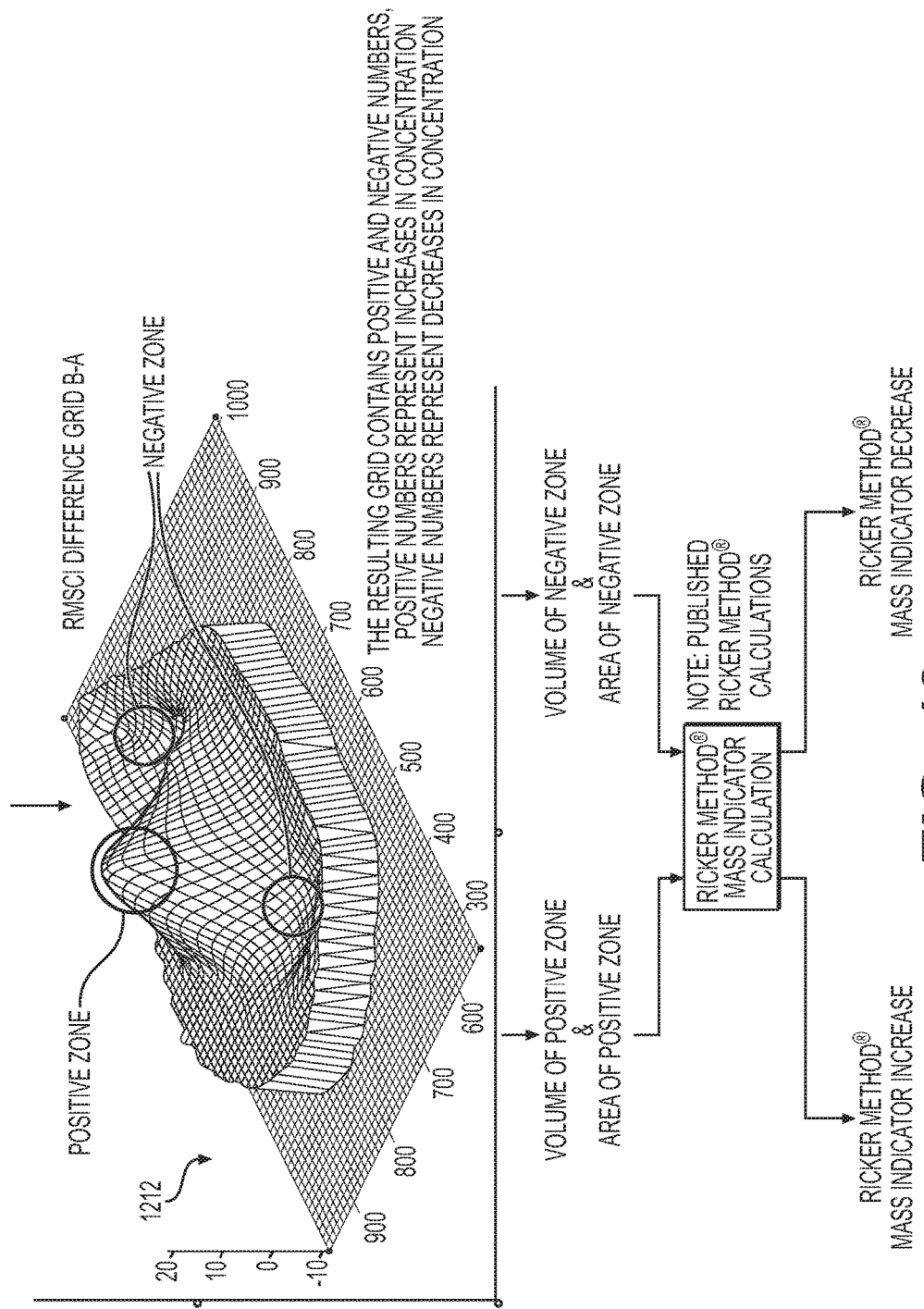

FIG. 12 illustrates a diagram of a method of determining the spatial-change grid data and of calculating the mass increase indicator and the mass decrease indicator, in accordance with an illustrative embodiment. In FIG. 12, example spatial grid data 1202 and 1204 are shown as an array of concentration values. Operation 210, as described in relation to FIG. 2, is performed on spatial grid data 1202 and 1204 to produce a modified spatial grid data 1206 and 1208. Each of the modified spatial grid data 1206, 1208 includes blank regions 1210 corresponding to areas with insignificant change values outside the plume boundary.

Referring still to FIG. 12, the spatial-change grid data 1212 is then generated by performing a difference operation between the modified spatial grid data 1206 and 1208.

Referring still to FIG. 12, using each pre-normalized difference grid data 1212, the volume under the curve of positive values as well as the respective planar area are measured (e.g., to determine the volume increase and the area increase). Subsequently, using procedures described in Ricker 2008, incorporated by reference herein, an average concentration and mass indicator are calculated using the volume increase (see Equation 6) and area increase values (see Equation 7). The resulting mass indicator calculated (not shown) is the mass increase indicator.

$$V_{increase} = \frac{1}{3} \times \pi \times \frac{D^2_{increase}}{4} \times H \qquad \text{(Equation 6)}$$

$$A_{increase} = \pi \times \frac{D^2_{increase}}{4} \qquad \text{(Equation 7)}$$

Similarly the volume and area of the negative values (see Equations 8 and 9) in the pre-normalized difference grid are used to calculate the mass indicator decrease. These two metrics provide context for the magnitude of the areas of increase and decrease in the exemplified presentation 102.

$$V_{decrease} = \frac{1}{3} \times \pi \times \frac{D^2_{decrease}}{4} \times H \qquad \text{(Equation 8)}$$

$$A_{decrease} = \pi \times \frac{D^2_{decrease}}{4} \qquad \text{(Equation 9)}$$

Example Computing Device

Figure 13:
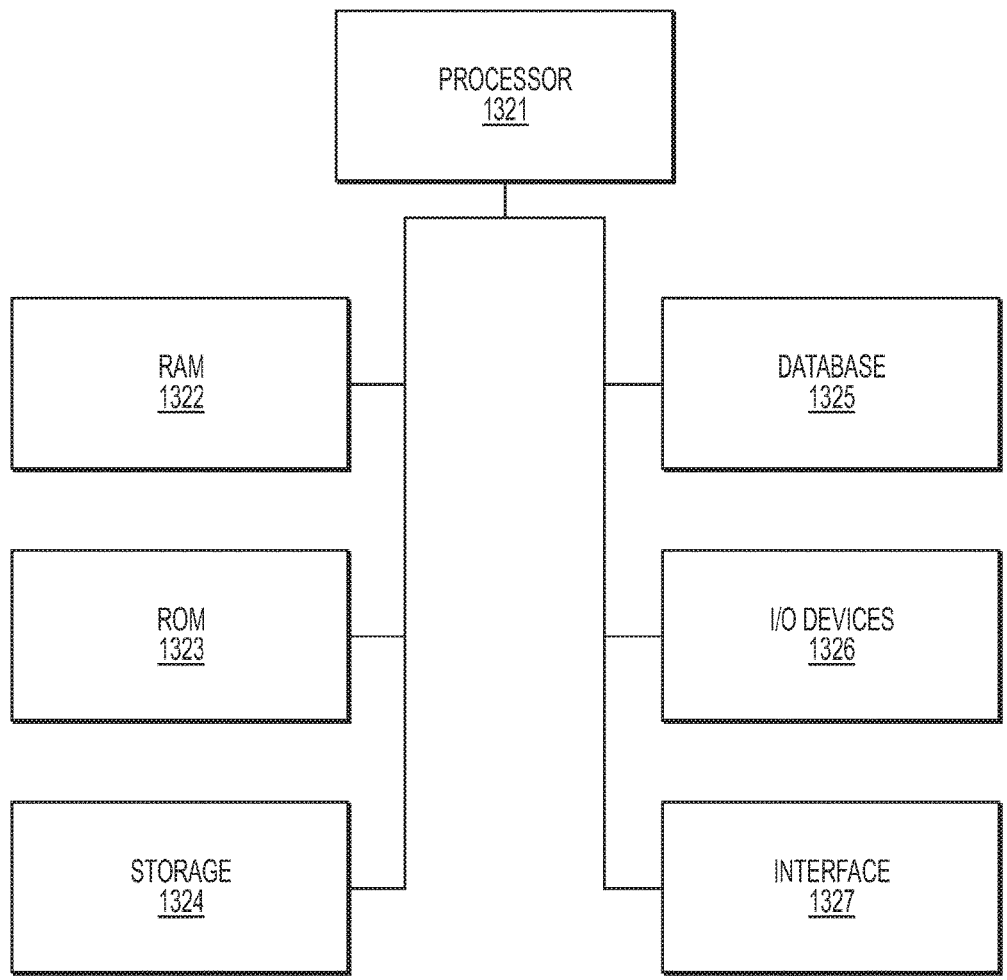
FIG. 13 illustrates an exemplary computer that can be used for executing the methods described herein.

FIG. 13 illustrates an exemplary computer that can be used for executing the methods described herein. As used herein, "computer" may include a plurality of computers. The computer may be a standalone system (e.g., a desktop, laptop, or server) or maybe a computing device located in a network (e.g., a cloud based system).

The computers may include one or more hardware components such as, for example, a processor 1321, a random access memory (RAM) module 1322, a read-only memory (ROM) module 1323, a storage 1324, a database 1325, one or more input/output (I/O) devices 1326, and an interface 1327. Alternatively and/or additionally, the computer may include one or more software components such as, for example, a computer-readable medium including computer executable instructions for performing a method associated with the exemplary embodiments. It is contemplated that one or more of the hardware components listed above may be implemented using software. For example, storage 1324 may include a software partition associated with one or more other hardware components. It is understood that the components listed above are exemplary only and not intended to be limiting.

Processor 1321 may include one or more processors, each configured to execute instructions and process data to perform one or more functions associated with a computer for indexing images. Processor 1321 may be communicatively coupled to RAM 1322, ROM 1323, storage 1324, database 1325, I/O devices 1326, and interface 1327. Processor 1321 may be configured to execute sequences of computer program instructions to perform various processes. The computer program instructions may be loaded into RAM 1322 for execution by processor 1321. As used herein, processor refers to a physical hardware device that executes encoded instructions for performing functions on inputs and creating outputs.

RAM 1322 and ROM 1323 may each include one or more devices for storing information associated with operation of processor 1321. For example, ROM 1323 may include a memory device configured to access and store information associated with controller 1320, including information for identifying, initializing, and monitoring the operation of one or more components and subsystems. RAM 1322 may include a memory device for storing data associated with one or more operations of processor 1321. For example, ROM 1323 may load instructions into RAM 1322 for execution by processor 1321.

Storage 1324 may include any type of mass storage device configured to store information that processor 1321 may need to perform processes consistent with the disclosed embodiments. For example, storage 1324 may include one or more magnetic and/or optical disk devices, such as hard drives, CD-ROMs, DVD-ROMs, or any other type of mass media device.

Database 1325 may include one or more software and/or hardware components that cooperate to store, organize, sort, filter, and/or arrange data used by controller 1320 and/or processor 1321. For example, database 1325 may store hardware and/or software configuration data associated with input-output hardware devices and controllers, as described herein. It is contemplated that database 1325 may store additional and/or different information than that listed above.

I/O devices 1326 may include one or more components configured to communicate information with a user associated with the computer. For example, I/O devices may include a console with an integrated keyboard and mouse to allow a user to maintain a database of images, update associations, and access digital content. I/O devices 1326 may also include a display including a graphical user interface (GUI) for outputting information on a monitor. I/O devices 1326 may also include peripheral devices such as, for example, a printer for printing information associated with controller 1320, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface 1327 may include one or more components configured to transmit and receive data via a communication network, such as the Internet, a local area network, a workstation peer-to-peer network, a direct link network, a wireless network, or any other suitable communication platform. For example, interface 1327 may include one or more modulators, demodulators, multiplexers, demultiplexers, network communication devices, wireless devices, antennas, modems, and any other type of device configured to enable data communication via a communication network.

While the methods and systems have been described in connection with preferred embodiments and specific examples, it is not intended that the scope be limited to the particular embodiments set forth, as the embodiments herein are intended in all respects to be illustrative rather than restrictive.

The various embodiments can be used in a similar manner for any dataset that involves the analysis of data acquired from data points over time, e.g., to the analysis of temperature data, noise/sound data, and any other type of measureable data acquired over time.

The various embodiments can be used in a similar manner for applications in which data have been measured spatially over time, such as measurements of temperature, measurements of sound, measurements of light (i.e. lumens), measurements of wind, etc.

The various embodiments can be used on other media in addition to groundwater.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method of generating presentation of spatial changes of a plume, the method comprising:
retrieving, by a processor, a plurality of data sets associated with the plume, wherein the plurality of data sets include a first data set and a second data set, wherein the first data set is associated with measurements collected at a plurality of monitoring wells over a plume site at a first date, and wherein the second data set is associated with measurements collected at the plurality of monitoring wells, or a portion thereof, at a second date;
determining, by the processor, a grid node-to-grid node difference between i) a first spatial grid data set comprising a set of data nodes generated from the first data set and ii) a second spatial grid data set comprising a set of data nodes generated from the second data set to determine a difference data set, wherein each of the set of data nodes defines a location of the respective spatial grid data set, and wherein the difference data set includes a positive and a negative sign indicating expansion and contraction of the plume;
normalizing, by the processor, the difference data set to generate a spatial-change grid data set, wherein the normalization is based on a relative change value selected from the group consisting of a determined maximum relative-change value determined from all data associated with the plume, a determined maximum relative-change value determined from some data associated with the plume, and a relative-change value determined from a maximum relative-change value for the plume, and wherein, for each portion of the second spatial grid data set determined to have no plume and a corresponding portion of the first spatial grid data set determined to have the plume, the normalization step includes updating a corresponding portion of the generated spatial-change grid data set to a first value; and
causing, by the processor, graphical presentations of spatial changes of the plume based on the generated spatial-change grid data set, wherein gradation of changes having a positive sign value in a region of the spatial-change grid data set is presented with an associated first indication, wherein gradation changes having a negative sign value in a region of the spatial-change grid data set is presented with an associated second indication, and wherein regions of the spatial-change grid data set having the first value are presented with an associated third indication, and
wherein at least one of the graphical presentations of the first, second, and third indications of the spatial changes indicates at least one of i) an area associated with where remediation goals are met at the plume site, ii) an area associated with where plume migration has occurred at the plume site, and iii) an area where a new plume has formed at the plume site, and is used to direct remedial efforts at the plume site, to alter a current remedial plan of the plume site, or to prompt investigation and/or modification of monitoring wells of the plume site.

2. The method of claim 1, further comprising:
for each portion of the second spatial grid data set determined to have the plume and a corresponding portion of the first spatial grid data set determined to not have a plume, the normalization step includes updating the corresponding portion of the generated spatial-change grid data set to a second value, wherein regions of the generated spatial-change grid data set having the second value are presented with an associated fourth indication, wherein the fourth indication is used to direct remedial efforts at the plume site, to alter the current remedial plan of the plume site, or to prompt investigation and/or modification of monitoring wells of the plume site.

3. The method of claim 2, comprises:
retrieving, by the processor, a third data set of the plurality of data sets, wherein the third data set is associated with measurements collected at the plurality of monitoring wells, or a portion thereof, over the plume site at a third date, the first date being prior to the third date,
determining, by the processor, a second grid node-to-grid node difference between i) the first spatial grid data set comprising the set of data nodes generated from the first data set and ii) a third spatial grid data set comprising a set of data nodes generated from the third data set to determine a second difference data set; and
normalizing, by the processor, the second difference data set to generate a second spatial-change grid data set, wherein the normalization is based on a relative change value selected from the group consisting of a determined maximum relative-change value determined from all data associated with the plume, a determined maximum relative-change value determined from some data associated with the plume, and a relative-change value determined from a maximum relative-change value for the plume, and wherein, for each portion of the third spatial grid data set determined to have no plume and a corresponding portion of the first spatial grid data set determined to have the plume, the normalization step includes updating the corresponding portion of the generated second spatial change grid data set to the first value, and wherein, for each portion of the third spatial grid data determined to have the plume and a corresponding portion of the first spatial grid data set determined to not have the plume, the normalization step includes updating the corresponding portion of the generated second spatial-change grid data set to a second value; and causing, by the processor, a second graphical presentation of spatial changes of the plume based on the generated the second spatial-change grid data set, wherein the second graphical presentation of spatial changes of the plume is also used to direct remedial efforts at the plume site, to alter the current remedial plan of the plume site, or to prompt investigation and/or modification of monitoring wells of the plume site.

4. The method of claim 3, wherein the first value is adjusted to a value outside a range associated with the second difference data set normalized by the relative-change value, wherein the second value is adjusted to a value outside a range associated with the second difference data set normalized by the relative-change value, and wherein the first value is different from the second value.

5. The method of claim 2, wherein the portion of the second spatial grid data set determined to have a plume and the corresponding portion of the first spatial grid data set determined to not have a plume is determined based on:

if (node(x,y) of grid $B \geq BL$) AND if (node(x,y) of grid $A < BL$)

wherein node(x,y) denotes a node value at a position x and position v of the grid data, Grid B refers to the second spatial grid data set, Grid A refers to the first spatial grid data set, and BL refers to a data set of baseline concentration data.

6. The method of claim 2, wherein the second value is adjusted to a value outside a range associated with the difference data set normalized by the relative-change value.

7. The method of claim 1, wherein the generated spatial-change grid data set comprises a priori spatial-change grid data set from the plurality of data sets associated with the plume, wherein the first data set is associated with measurements collected at the first date which occurs at, or after, a baseline date and the second data set is associated with measurements collected at the second date which immediately follows the first date in measurement sequence.

8. The method of claim 1, wherein the first spatial-change grid data set generated from the first data set and second data set is generated at a determined first inflection point in a determined trend of the plume.

9. The method of claim 8, wherein the determined trend is selected from the group consisting of a mass indicator trend, a concentration trend, and an areal trend.

10. The method of claim 1, wherein the spatial-change grid data set is generated over a plurality of data sets associated with a determined constant trend of the plume.

11. The method of claim 1, further comprising:
in response to determining that each corresponding node of the first spatial grid data set and the second spatial grid data set both have values less than a baseline concentration, updating, by the processor, the corresponding node of the first spatial grid data set and the second spatial grid data set to a value of a third value, wherein regions of the spatial-change grid data set having the third value are presented with an associated fourth indication, wherein the fourth indication is used to direct remedial efforts at the plume site, to alter the current remedial plan of the plume site, or to prompt investigation and/or modification of monitoring wells of the plume site.

12. The method of claim 11, wherein the normalization step is based on:

$$\text{Grid}\Delta(x, y)' = \frac{\text{Grid}\Delta(x, y)}{|\max(\text{Grid}\Delta(x, y))_{n=1...n\_max}|} \text{ for } x = 1 \ldots x_{max},$$

$$y = 1 \ldots y_{max}$$

wherein $\text{Grid}\Delta(x, y)$ denotes the determined difference between the first spatial grid data set and the second spatial grid data set, $\text{Grid}\Delta(x, y)'$ denotes the generated first spatial-change grid data set, and $|\max(\text{Grid}\Delta(x, v))_{n=1 \ldots n\_max}|$ denotes the relative-change value determined among data-sets 1 to $n_{max}$ used to generate $\text{Grid}\Delta(x,y)$.

13. The method of claim 1, wherein the portion of the second spatial grid data set determined to have no plume and the corresponding portion of the first spatial grid data set determined to have the plume is determined based on:

if (node(x,y) of Grid $B < BL$) AND if (node(x,y) of Grid $A \geq BL$)

wherein node(x,y) denotes a node value at a x, y position of the grid data, Grid B refers to the second spatial grid data set, Grid A refers to the first spatial grid data set, and BL refers to a data set of baseline concentration data.

14. The method of claim 1, wherein each of the first data set and the second data set comprises a generated contaminant concentration isopleth map of raw monitoring well data.

15. The method of claim 1, wherein the first spatial grid data set is retrieved from the first data set.

16. The method of claim 1, wherein the first spatial grid data set is a processed set of data values derived from the first data set.

17. The method of claim 1, comprising:
determining, by the processor, a first mass change value associated with an increase in plume mass;
determining, by the processor, a second mass change value associated with a decrease in plume mass; and
causing, by the processor, a graphical presentation of the first mass change value and the second mass change value proximal to the graphical presentation of spatial changes.

18. The method of claim 1, wherein the graphical presentation of the spatial changes of the plume comprises: a first base color to denote an increase in mass indicator, a second base color to denote a decrease in the mass indicator, and a third base color to denote an area of successful remediation.

19. The method of claim 1, wherein the graphical presentation of spatial changes of the plume comprises a boundary line that denotes an area of successful remediation.

20. The method of claim 1, wherein the first value is adjusted to a value outside a range associated with the difference data set normalized by the relative-change value.

21. A system of generating a presentation of spatial changes of a plume, the system comprising:
a processor; and
a memory having instructions stored thereon, wherein execution of the instructions, cause the processor to:
retrieve a plurality of data sets associated with the plume, wherein the plurality of data sets include a first data set and a second data set, wherein the first data set is associated with measurements collected at a plurality of monitoring wells over a plume site at a first date, and wherein the second data set is associated with measurements collected at a plurality of monitoring wells, or a portion thereof, at a second date;
determine a grid node-to-grid node difference between i) a first spatial grid data set comprising a set of data nodes generated from the first data set and ii) a second spatial grid data set comprising a set of data nodes generated from the second data set to determine a difference data set; and
normalize the difference data set to generate a spatial-change grid data set, wherein the normalization is based on a relative change value selected from the group consisting of a determined maximum relative-change value determined from all data associated with the plume, a determined maximum relative-change value determined from some data associated with the plume, and a relative-change value determined from a maximum relative-change value for the plume;
adjust a portion of the spatial-change grid data set to a first value i) for each portion of the second spatial grid data set determined to have no plume and a corresponding portion of the first spatial grid data set determined to have a plume or ii) for each portion of the second spatial grid data set determined to have the plume and a corresponding portion of the first spatial grid data set determined to have no plume; and
cause graphical presentations of the spatial changes of the plume based on the generated spatial-change grid data set, wherein gradation of changes having a positive sign value in a region of the spatial-change grid data set is presented with an associated first indication, wherein gradation changes having a negative sign value in a region of the spatial-change grid data set is presented with an associated second indication, and wherein regions of the spatial-change grid data set having the first value is presented with an associated third indication, and
wherein at least one of the graphical presentations of the first, second, and third indications of the spatial changes indicates at least one of i) an area associated with where remediation goals are met at the plume site, ii) an area associated with where plume migration has occurred at the plume site, and iii) an area where a new plume has formed at the plume site, and is used to direct remedial efforts at the plume site, to alter a current remedial plan of the plume site, or to prompt investigation and/or modification of monitoring wells of the plume site.

22. The system of claim 21, wherein the first value is adjusted to a value outside a range associated with the difference data set normalized by the relative-change value.

23. A non-transitory computer readable medium having instructions stored thereon, wherein the instructions when executed by a processor, cause the processor to:
retrieve a plurality of data sets associated with the plume, wherein the plurality of data sets include a first data set and a second data set, wherein the first data set is associated with measurements collected at a plurality of monitoring wells over a plume site at a first date and the second data set is associated with measurements collected at a plurality of monitoring wells, or a portion thereof, at a second date;
determine a grid node-to-grid node difference between i) a first spatial grid data set comprising a set of data nodes generated from the first data set and ii) a second spatial grid data set comprising a set of data nodes generated from the second data set to determine a difference data set; and
normalize the difference data set to generate a spatial-change grid data set, wherein the normalization is based on a relative change value selected from the group consisting of a determined maximum relative-change value determined from all data associated with the plume, a determined maximum relative-change value determined from some data associated with the plume, and a relative-change value determined from a maximum relative-change value for the plume;
adjust a portion of the spatial-change grid data set to a first value i) for each portion of the second spatial grid data set determined to have no plume and a corresponding portion of the first spatial grid data set determined to have a plume or ii) for each portion of the second spatial grid data set determined to have a plume and a corresponding portion of the first spatial grid data set determined to have no plume; and
cause graphical presentations of the spatial changes of a plume based on the generated spatial-change grid data set, wherein gradation of changes having a positive sign value in a region of the spatial-change grid data set is presented with an associated first indication, wherein gradation changes having a negative sign value in a region of the spatial-change grid data set is presented with an associated second indication, and wherein regions of the spatial-change grid data set having the first value is presented with an associated third indication, and
wherein at least one of the graphical presentations of the first, second, and third indications of the spatial changes indicates at least one of i) an area associated with where remediation goals are met at the plume site, ii) an area associated with where plume migration has occurred at the plume site, and iii) an area where a new plume as formed at the plume site, and is used to direct remedial efforts at the plume site, to alter a current remedial plan of the plume site, or to prompt investigation and/or modification of monitoring wells of the plume site.

24. The non-transitory computer readable medium of claim 23, wherein the first value is adjusted to a value outside a range associated with the difference data set normalized by the relative-change value.

* * * * *